US012378103B2

(12) United States Patent
Boireaud et al.

(10) Patent No.: US 12,378,103 B2
(45) Date of Patent: Aug. 5, 2025

(54) AERIAL LIFT WITH REMOVABLE CONTROL CONSOLE, COMPRISING A PROTECTION DEVICE FOR PREVENTING THE OPERATOR FROM BEING CRUSHED

(71) Applicant: HAULOTTE GROUP, Lorette (FR)

(72) Inventors: François Boireaud, Chabaniere (FR); Nicolas Bonnefoy, Saint-Chamond (FR); Arnaud Colasse, Lyons (FR)

(73) Assignee: HAULOTTE GROUP, Lorette (FR)

( * ) Notice: Subject to any disclaimer, the term of this patent is extended or adjusted under 35 U.S.C. 154(b) by 1065 days.

(21) Appl. No.: 17/420,898

(22) PCT Filed: Jan. 8, 2020

(86) PCT No.: PCT/IB2020/050127

§ 371 (c)(1),
(2) Date: Jul. 6, 2021

(87) PCT Pub. No.: WO2020/144601

PCT Pub. Date: Jul. 16, 2020

(65) Prior Publication Data

US 2022/0063974 A1 Mar. 3, 2022

(30) Foreign Application Priority Data

Jan. 9, 2019 (FR) .................................... 1900186

(51) Int. Cl.
*B66F 17/00* (2006.01)
*B66F 11/04* (2006.01)

(52) U.S. Cl.
CPC .......... *B66F 11/042* (2013.01); *B66F 17/006* (2013.01)

(58) Field of Classification Search
CPC ............................ B66F 11/042; B66F 17/006
See application file for complete search history.

(56) References Cited

U.S. PATENT DOCUMENTS

| | | | |
|---|---|---|---|
| 2,815,250 A | 12/1957 | Thornton-Trum et al. | |
| 4,979,588 A | 12/1990 | Backer et al. | |
| 9,656,845 B2 * | 5/2017 | Dittus | B66F 11/044 |
| 10,926,986 B2 * | 2/2021 | Parot | B66F 17/006 |
| 11,401,148 B2 * | 8/2022 | Maisonnette | B66F 17/006 |
| 2016/0075543 A1 | 3/2016 | Lombardo et al. | |

FOREIGN PATENT DOCUMENTS

| | | |
|---|---|---|
| EP | 2190775 A1 | 6/2010 |
| FR | 3007401 A1 | 12/2014 |
| FR | 3056203 A1 | 3/2018 |
| GB | 2481709 A1 | 1/2012 |

(Continued)

*Primary Examiner* — James O Hansen

(74) *Attorney, Agent, or Firm* — 24IP Law Group USA, PLLC; Timothy R. DeWitt

(57) ABSTRACT

The aerial lift comprises a lifting mechanism for raising the working platform 3, which lifting mechanism is provided with a guardrail 40. A protection device 70 prevents an operator from being crushed against the guardrail 40 or against the control console 50. The protection device 70 comprises a bar 90. The control console 50 can be removably mounted on the protection device 70 near the bar 90. The protection device 70 comprises a sensor for detecting when the bar 90 is pressed by the operator, which causes the platform to stop moving.

20 Claims, 22 Drawing Sheets

(56) References Cited

FOREIGN PATENT DOCUMENTS

| | | | |
|---|---|---|---|
| GB | 2495158 | A | 4/2013 |
| JP | H0453800 | U | 5/1992 |
| JP | 5124800 | A | 6/1992 |
| JP | H0465299 | U | 6/1992 |
| JP | H0592298 | U | 12/1993 |
| JP | 10007398 | A | 3/1998 |
| JP | 6412100 | B2 | 10/2018 |
| KR | 20090062780 | A | 6/2009 |
| KR | 20090063626 | A | 6/2009 |
| KR | 200465878 | Y1 | 3/2013 |
| WO | 2011015815 | A1 | 2/2011 |
| WO | 2015004178 | A1 | 1/2015 |
| WO | 2017098120 | A1 | 6/2017 |
| WO | 2017178737 | A1 | 10/2017 |

* cited by examiner

AERIAL LIFT WITH REMOVABLE CONTROL CONSOLE, COMPRISING A PROTECTION DEVICE FOR PREVENTING THE OPERATOR FROM BEING CRUSHED

BACKGROUND OF THE INVENTION

Field of the Invention

The present invention relates to the field of Mobile Elevating Work Platforms (MEWP), commonly known as aerial work platforms. More particularly, the invention relates to an aerial work platform with a removable control panel and provided with a protection device to protect an operator on board the working platform from being crushed against at least the guardrail or the control panel.

Brief Description of the Related Art

Aerial work platforms are machines intended to allow one or more people to work at a height. For this purpose, they include a working platform intended to receive one or more persons. The working platform comprises a floor surrounded by a guardrail. The working platform is supported by a lifting mechanism that allows it to be raised from a lowered position on the chassis of the aerial work platform to the desired working position at a height. Aerial work platforms can also be self-propelled, i.e., motorised to allow their autonomous movement along the ground. The working platform is equipped with a control panel fitted with control members allowing an operator to activate the lifting mechanism and, if necessary, the movement of the aerial work platform along the ground.

The control panel is often fixedly mounted on the working platform, i.e., it is permanently mounted to a given location of it, although it may be possible to remove it with tools for maintenance or replacement purposes only. It is then generally fixedly attached to, or at the level of, the guardrail and is intended for the operator to stand in front of it when he wishes to manipulate the control members.

In contrast, in the case of scissor lifts and vertical mast lifts in particular, the control panel is sometimes removable, e.g., so that it can be moved by the operator so that it can be hung to different locations of the guardrail, e.g., to the front or rear side of the platform. For this purpose, the panel is generally more compact and lighter than fixed control panels. The control panel can also be designed so that the operator can hold it with one hand and manipulate its control members with the other, which makes it possible to control the aerial work platform from the ground instead of doing so from the platform. In this case, the control panel is even more compact and lighter.

When the operator at the control panel of the working platform causes the working platform to move, there is a risk that the operator could be crushed against the control panel by an external obstacle, such as a part of a building, a structure or a tree branch, striking him from behind or from above. The same risk may exist in relation to the guardrail.

Therefore, it is advisable to equip aerial work platforms with a crush protection device for the operator on board the working platform.

In the case of removable control panels, few solutions have been proposed so far. In WO 2017/178737 A1, the applicant proposed a solution using one or more non-physical barrier systems, in particular based on photodetectors, to protect the operator from being crushed against the control panel or against a part of the guardrail adjacent to the control panel when the control panel is hung to the guardrail of the working platform. This solution provides a significant improvement in operator safety against crushing, but has some disadvantages. In particular, the operator may have difficulty perceiving and understanding the existence and operation of the non-physical barriers because they are not visible or are only slightly visible, which makes it difficult to use the control panel. In addition, there is a risk that the photodetectors can become clogged, preventing the crush protection device from functioning properly.

For aerial work platforms with a fixedly mounted control panel on the working platform, a number of anti-crush protection solutions against the control panel have been proposed.

For example, it is known to mount a fixed or movable safety bar in front of the control panel, which is interposed between the control panel and the operator standing in front of the control panel in order to manipulate its control members.

For example, WO 2015/004178 A1 discloses a control panel fixedly mounted on the working platform of the aerial work platform, as well as a safety device comprising a first and a second tubular element which are each in the form of a hoop and are rotatably mounted on either side of the control panel. The two tubular elements are connected by connecting bars so that the rotation of the first so-called detection element causes a rotation of the second so-called safety element. When a downward rotation of the first element is caused due to pushing by the operator being hit from behind by an obstacle, the second element is rotated upwards so that the two elements assume a so-called safety position in which they delimit a free volume around the control panel and the control members, preventing the operator's trunk and arms from coming into contact with the control panel and thus preventing the operator from unintentionally actuating the control panel. This safety device works only by the mechanical action of the operator, without any electrical element needed to activate it.

It is more usual to provide that the control circuit of the aerial work platform inhibits the movements of the aerial work platform when the bar is mechanically loaded towards the control panel. This type of solution is illustrated in particular by FR 3 007 401 A1, EP 2 190 775 A1, JP 64-12100, JP H4-77600 U, GB 2 481 709 A1 and WO 2017/098120 A1. Alternatively, JP 5-124800 A proposes to arrange light barriers in front of and above the control panel by means of arms arranged on both sides of the control panel.

However, the disadvantage of this type of solution is that the operator is not protected against the risk of being crushed against the guardrail when standing next to the control panel instead of in front of it. Above all, this type of solution is intended for fixed control panels and is difficult to apply, or even totally unsuitable, to removable control panels because of their compactness and their removable mounting on the guardrail, which does not provide a sufficiently solid hold on the guardrail.

It has also been proposed that the control panel be fixedly mounted on the working platform, but be movable against springs cooperating with a limit sensor, which makes it possible to detect the crushing of the operator against the panel due to its movement: see in particular JP H4-53800 U and WO 2011/015815 A1. This type of solution is not satisfactory in view of the necessary stiffness of the springs, which is incompatible with adequate protection of the operator, and it is also totally unsuitable for operator-movable control panels.

Furthermore, in order to detect a collision or a risk of collision of the working platform with obstacles, solutions based on mechanical detection systems have been proposed, using rods or a frame that are placed on the working platform and that cooperate with sensors: see, for example, U.S. Pat. Nos. 2,815,250, 4,979,588, KR 200465878U, JP 10007398 and KR 20090063626 A. Still other solutions are based on a possibility to move a part of the guardrail: see, for example, JP H4-65299 U and JP H5-92298 U. KR 20090062780 A proposes yet another solution consisting of arranging uprights on the upper corners of the guardrail to support laser transmitters and laser receivers at their upper ends so as to create a light barrier above each side panel of the guardrail.

But all these solutions have various drawbacks. Most of them are cumbersome, interfere with the handling of materials on board the platform, are exposed to shocks during these manipulations and are not adapted to the use of the aerial work platform in a very crowded environment such as under roofs or structures where beams intersect. The protection device can be unintentionally triggered by materials placed on or against the guardrail. These solutions are often difficult or impossible to implement when the working platform has extendable parts at its opposite ends to vary its length or when the guardrail is of the type that can be folded down and folded onto the floor of the working platform.

It was also proposed by GB 2 495 158 A to equip the platform with proximity sensors on the top of the guardrail to detect the proximity of external obstacles to the working platform. In a more sophisticated way, US 2016/0075543 A1 discloses the use of a stereoscopic camera to determine the position of the operator on the platform in order to prevent movements of the working platform or to detect external obstacles around the working platform and adapt the speed accordingly to the distance and shape of the obstacle, which requires real-time electronics to process the camera signals which is complex. In both cases, these solutions are not adapted to the use of the aerial work platform in a very crowded environment at height, such as under roofs or engineering structures where beams intersect. In addition, there is a risk of unintentional activation if materials such as supporting boards or props are placed against or on the guardrail.

There is therefore a need for improved anti-crush protection of the operator on board the working platform, particularly for aerial work platforms with a removable control panel.

SUMMARY OF THE INVENTION

It is the purpose of the present invention to provide such an improved solution which at least partially alleviates the aforementioned drawbacks.

More particularly, the invention aims to provide, for aerial work platforms with a removable control panel, an anti-crush protection solution for the operator on board the working platform which is simple to implement, robust and reliable, easily understood by the operator, compatible with the possibility of placing materials on or against the guardrail of the working platform.

For this purpose, the present invention provides an aerial work platform, comprising:

a working platform comprising a floor and a guardrail;

a lifting mechanism to move the working platform in height;

a control panel to control the lifting mechanism; and a protection device for protecting an operator on board the working platform from being crushed against at least one of the guardrail or the control panel;

the protection device comprising:

a bar mounted on the working platform so as to be adjacent to a section of the guardrail; and a mounting system provided for removably mounting the control panel thereto so as to hold it in place on board the working platform in a predefined mounting position which is adjacent to said section of the guardrail and adjacent to the bar, wherein:

the bar is configured and mounted on the working platform such that, when the control panel is mounted to the mounting system, the bar is held in a holding position in proximity to at least one of the control panel and said section of the guardrail with the possibility to move towards the control panel, or towards said section of the guardrail respectively, and the protection device further comprises at least one sensor for detecting whether the bar is pushed towards the control panel or towards said section of the guardrail respectively.

Thus, when the control panel is mounted to the mounting system of the protection device, the bar of the protection device can protect the operator who is standing at the control panel, from being crushed against it and/or against the part of section of the guardrail which is adjacent to the operator. This is because the bar of the protection device is interposed between the operator and the control panel and/or the adjacent part of the section of the guardrail. If the operator, standing in front of the control panel, is hit from behind or above by an obstacle outside the aerial work platform when lifting the working platform or moving the aerial work platform on the ground, which he has commanded at the control panel, he is then pushed by the obstacle against the bar of the protection device, which is consequently pushed towards the control panel and/or the section of the guardrail adjacent to the control panel. And the sensor of the protection device detects that the bar has been pushed in this way. Based on this detection, the aerial work platform control circuit can inhibit the current aerial work platform movement to prevent the operator from being crushed. The bar can be designed and arranged on the working platform to protect the operator from being crushed either against the control panel when mounted to the mounting system of the protection device, or against the part of the section of the guardrail located next to the area where the operator normally stands at the control panel so mounted to the mounting system. However, it is preferable that the bar be designed to protect the operator from being crushed both against the control panel and against this part of the section of the guardrail, when the control panel is mounted to the mounting system of the protection device.

The protection device can be easily implemented, in particular by means of mechanical elements simple to realize. The use of a movable bar placed between the operator and the control panel and/or the adjacent part of the section of the guardrail is easily understood by the operator as constituting a crush protection device. In addition, the use of a moveable bar is more robust and reliable in terms of operation than non-physical barriers based on photodetectors which are susceptible to clogging. Since the bar of the protection device provides localized protection in the area near the mounting system of the control panel, it is also possible to place materials on or against the guardrail of the working platform outside this area without the risk of the protection device being unintentionally triggered or damaged. Lastly, the mounting system and the bar of the protection device can, where relevant, be designed in such a way that they do not interfere with the folding of the guardrail onto the floor of the working platform.

According to preferred embodiments, the invention comprises one or more of the following characteristics:

- the control panel is adapted to be removably mounted to the mounting system of the protection device so that it can be moved and used by the operator at different locations of the working platform;
- the control panel is adapted to be used, at the operator's choice, hand-held or mounted on the working platform, the control panel being mountable on the working platform preferably by means of the mounting system;
- the control panel comprises control members, the control panel being adapted so that an operator can simultaneously hold it with one hand and manipulate the control members with the other hand;
- the control panel has a handle for holding it with one hand;
- the control panel is adapted to be mounted manually to the mounting system of the protection device without the use of tools;
- the control panel is adapted to be removed manually from the mounting system of the protection device without the use of tools;
- the protection device is fixedly attached to a predetermined location of the working platform or of the guardrail;
- the protection device is removably mounted to the working platform or guardrail to allow it to be selectively mounted to different points on the working platform or guardrail;
- the possibility for the bar to move from the holding position towards the control panel, respectively towards said section of the guardrail, is effected against a resilient force biasing the bar towards the holding position;
- the possibility for the bar to move towards the control panel, respectively towards said section of the guardrail, is done by pivoting;
- the bar is configured and mounted to the working platform such that, when the control panel is mounted to the mounting system, the bar satisfies at least one of the following three characteristics:
  - i) in the holding position of the bar, at least one portion of the bar is arranged laterally with respect to a side of the control panel facing said section of the guardrail and extends in a plane perpendicular to the floor of the working platform which is substantially parallel to an upper part of said section of the guardrail, the portion further extending at a level above said section of the guardrail and the bar being able to move towards the floor of the working platform;
  - ii) in the holding position of the bar, at least one portion of the bar extends above the control panel, the bar being movable so that said portion moves towards the floor of the working platform; and
  - iii) in the holding position of the bar, at least one portion of the bar extends in front of the control panel, the bar being movable so that said portion moves towards the control panel.
- at least one portion of the bar according to characteristic i) is provided with a screen extending parallel to said section of the guardrail towards the floor of the guardrail so as to close a passage between said portion of the bar and the upper part of said guardrail side over a major part of the length of said portion of the bar;
- said predefined mounting position of the control panel is located towards a first end of the working platform, and the at least one portion of the bar according to characteristic i) extends beyond the control panel towards a second end of the working platform opposite the first end;
- in orthogonal projection on the floor of the working platform, the bar has an L-shape formed by a first and a second arm, at least one portion of the first arm of the L is according to characteristic i), and at least one portion of the second arm of the L is according to characteristic ii);
- a free end of the first arm of the L is hinged to said section of the guardrail at a location beyond the control panel towards the second end of the working platform;
- the bar is movable between the holding position in which the bar extends at least partially above the level of said section of the guardrail, and a lowered position in which the bar extends entirely at a level less than or equal to the upper part of said section of the guardrail; and the protection device comprises a bar deployment mechanism adapted to cooperate with the control panel so as:
  - to move the bar into the holding position when the control panel is mounted to the mounting system, and
  - to move the bar to the lowered position when the control panel is dismounted from the mounting system;
- the bar deployment mechanism comprises connecting rods articulated to each other, a first connecting rod of which is provided to cooperate with the control panel to move the bar into the holding position via at least a second connecting rod when the control panel is mounted to the mounting system;
- the bar deployment mechanism comprises:
  - two connecting rods articulated to each other, capable of being brought into abutment with each other to stop their relative pivoting in a pivoting direction, and
  - a spring biasing the two connecting rods into abutment with each other so as to hold the bar in the holding position when the control panel is mounted to the mounting system,
- wherein the possibility of the bar to move from the holding position towards the control panel, respectively towards said section of the guardrail, is achieved by pivoting the two connecting rods against the spring biasing the two rods;
- the bar moves to the lowered position by gravity when the control panel is dismounted from the mounting system;
- the aerial work platform is motorised to be able to move on the ground, the control panel being furthermore provided to control the movement of the aerial work platform along the ground;
- the control panel comprises at least a first manually operated control member to command the movement of the working platform in height and possibly the movement of the aerial work platform along the ground, and the aerial work platform further comprises:
  - a sensor for detecting whether the control panel is mounted to the mounting system or dismounted from the mounting system, and
  - a control circuit provided to limit a speed of movement of the working platform in height and optionally a speed of movement of the aerial work platform along the ground when the sensor determines that the control panel is dismounted from the mounting system;

the control panel or the protection device further comprises at least one second manually operated control member arranged relative to the first manually operated control member, when the control panel is mounted to the mounting system of the protection device, such that simultaneous actuation of the first manually operated control member and the second manually operated control member by an operator requires him to use a respective hand for the actuation of each, and the control circuit is provided to limit the speed of movement of the working platform in height and optionally the speed of movement of the aerial work platform along the ground or to inhibit such movement in the case where the corresponding movement is commanded by actuation of the first manually operated control in the absence of simultaneous actuation of the second manually operated control member as compared to the case where the corresponding movement is commanded by actuation of the first manually operated control member with simultaneous actuation of the second manually operated control member;

the first and second manually operated control members are arranged such that their simultaneous actuation by the operator requires him to position himself adjacent to the portion of the bar according to characteristic i);

the control panel is designed in such a way that it can be removably mounted on the working platform only by means of the mounting system of the protection device, at least as long as no external parts of the aerial work platform, such as ties, are used to attach it to the guardrail;

the aerial work platform is a scissor lift or a vertical mast aerial work platform.

Other characteristics and advantages of the invention will appear on reading the following description of a preferred embodiment of the invention, given as an example and with reference to the appended drawing.

BRIEF DESCRIPTION OF THE DRAWINGS

FIG. 1 shows a perspective view of the scissor lift with a crush protection device, the working platform being in the lowered position.

FIG. 2 shows a perspective view of the aerial work platform, the working platform being this time in the raised position.

FIG. 3 shows an isolated perspective view of the part of the working platform of the aerial work platform that is provided with the crush protection device for the operator.

FIG. 4 shows an isolated perspective view of the crush protection device and the control panel mounted to the mounting system of the crush protection device.

FIG. 5 shows an isolated perspective view of the part of the working platform fitted with the crush protection device without the control panel, its bar being in a lowered position.

FIG. 6 shows an isolated perspective view of the control panel.

FIG. 7 shows a top view of the part of the working platform provided with the crush protection device.

FIG. 8 shows a perspective view of the working platform with the operator standing in front of the control panel in the state mounted to the mounting system of the crush protection device.

FIG. 9 shows a view similar to FIG. 8, but with the operator shown in a situation where he is pushed towards the control panel.

FIG. 10 shows a view similar to FIG. 8, but with the operator shown in a situation where he is being pushed towards a part of the guardrail adjacent to the control panel.

FIG. 11 shows an isolated perspective view of the crush protection device without its cover, the bar of the crush protection device being shown in its lowered position which corresponds to the case where the control panel is dismounted from the mounting system of the crush protection device.

FIG. 12 shows a front view instead of a perspective view of the crush protection device in the same position as in FIG. 11, but without its cover to show its mechanism with connecting rods.

FIG. 13 shows an isolated front view of the crush protection device without its cover, the bar of the crush protection device being shown in its holding position, which corresponds to the case where the control panel is mounted to the mounting system of the crush protection device and in which it provides anti-crush protection for the operator.

FIG. 14 shows an isolated front view of the crush protection device, without its cover, in the situation where the control panel is mounted to the mounting system of the crush protection device, but the crush protection device bar is shown in its pushed-down position as it is in a situation where there is a risk of the operator being crushed.

FIG. 15 shows a local view of the protection device with the control panel mounted to it, viewed from the rear side of the control panel.

FIG. 16 shows a detail view of the area shown in FIG. 15.

In particular, FIG. 17 shows the protection device in the active state, the control panel being mounted and the detection bars being in their holding position.

FIG. 18 shows an isolated perspective view of the protection device to which the control panel is mounted, but in the situation where the sensor bar at the front of the control panel is pushed towards it.

FIG. 19 shows an isolated perspective view of the protection device when the control panel is not mounted to it, the detection bars being in the lowered position below the upper level of the guardrail.

FIG. 20 shows a front view instead of a perspective view of the protection device in the same position as in FIG. 19, but without its cover to show its mechanism with connecting rods.

FIG. 21 shows an isolated front view of the protection device, without its cover, the bars of the protection device being shown in their holding position, which corresponds to the case where the control panel is mounted to the mounting system of the protection device and in which it provides anti-crush protection for the operator.

FIG. 22 shows an isolated front view of the crush protection device without its cover in the situation where the control panel is mounted to the mounting system of anti-crush protection device, but the bar of the crush protection device which extends in front of the control panel is shown in the situation where it is pushed towards the control panel.

DETAILED DESCRIPTION OF THE INVENTION

Figure 1:
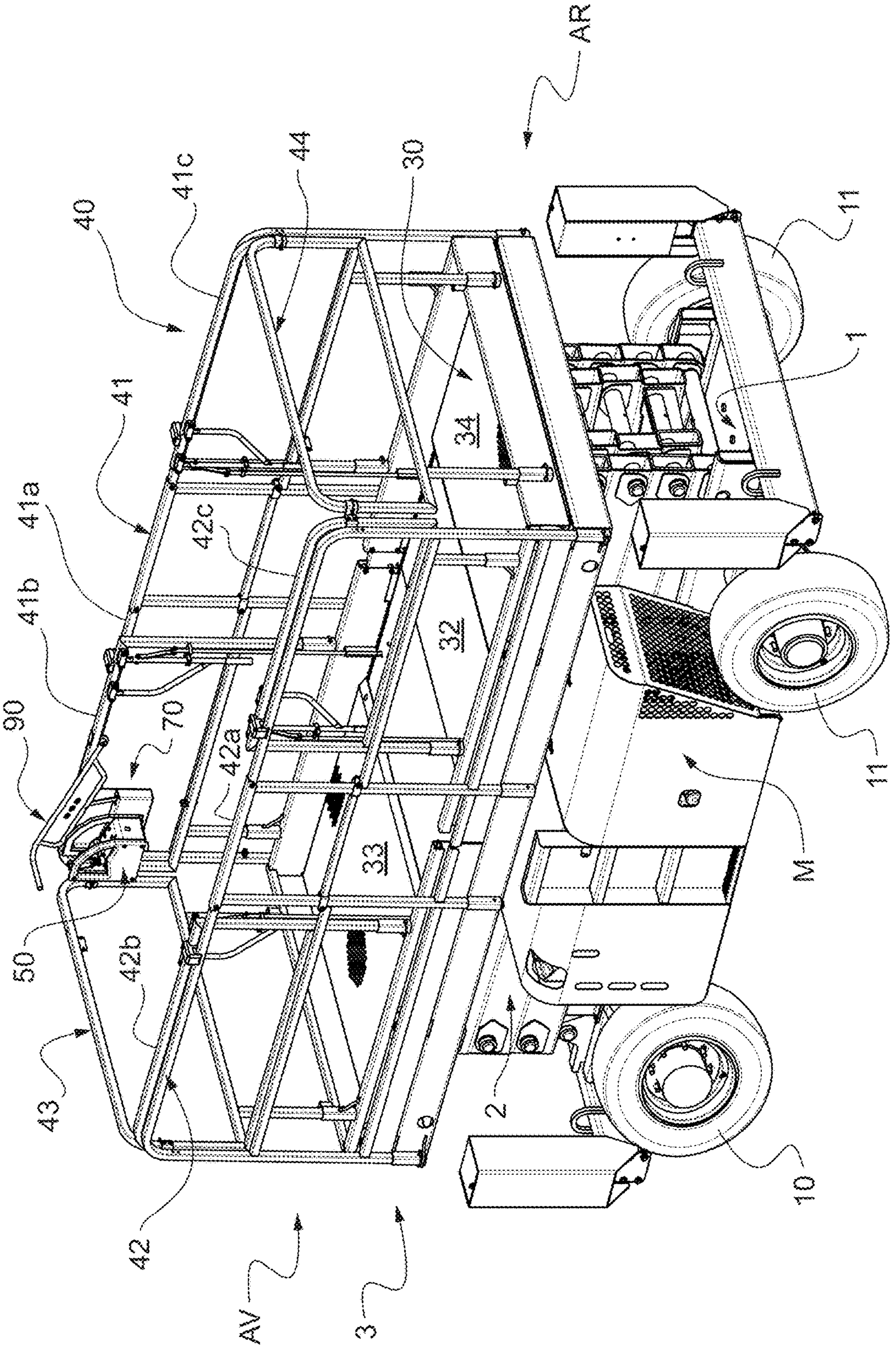
FIGS. 1 to 16 relate to the same preferred embodiment of a scissor lift provided with a crush protection device according to the invention comprising a single anti-crush detection bar.

With reference to FIGS. 1 to 14, we will now describe an aerial work platform according to a preferred embodiment of the invention. It comprises a chassis 1, a lifting mechanism 2 mounted on the chassis 1 and a working platform 3 mounted on the lifting mechanism 2.

The chassis 1 is provided with front wheels 10 and rear wheels 11, through which the chassis 1 rests on the ground and by means of which the aerial work platform can be moved on the ground. Alternatively, the chassis 1 is provided with tracks for ground travel.

The Aerial work platform is equipped with a motorization M to allow its autonomous movement on the ground. It can be an electric or combustion motorization, or even a hybrid motorization. The motorization M is usually mounted directly on the chassis 1. In view of the convention of moving the aerial work platform on the ground, its front side is referred to as AV and its rear side is referred to as AR. Alternatively, the aerial work platform is not motorized for the purpose of its movement on the ground. In this case, the aerial work platform is towed or is pushed to move it on the ground.

According to another variant, the frame 1 of the aerial work platform is arranged fixedly with respect to the ground or on a motor vehicle such as a lorry without the possibility of controlling the movement of the vehicle on the ground from the aerial work platform.

Figure 2:
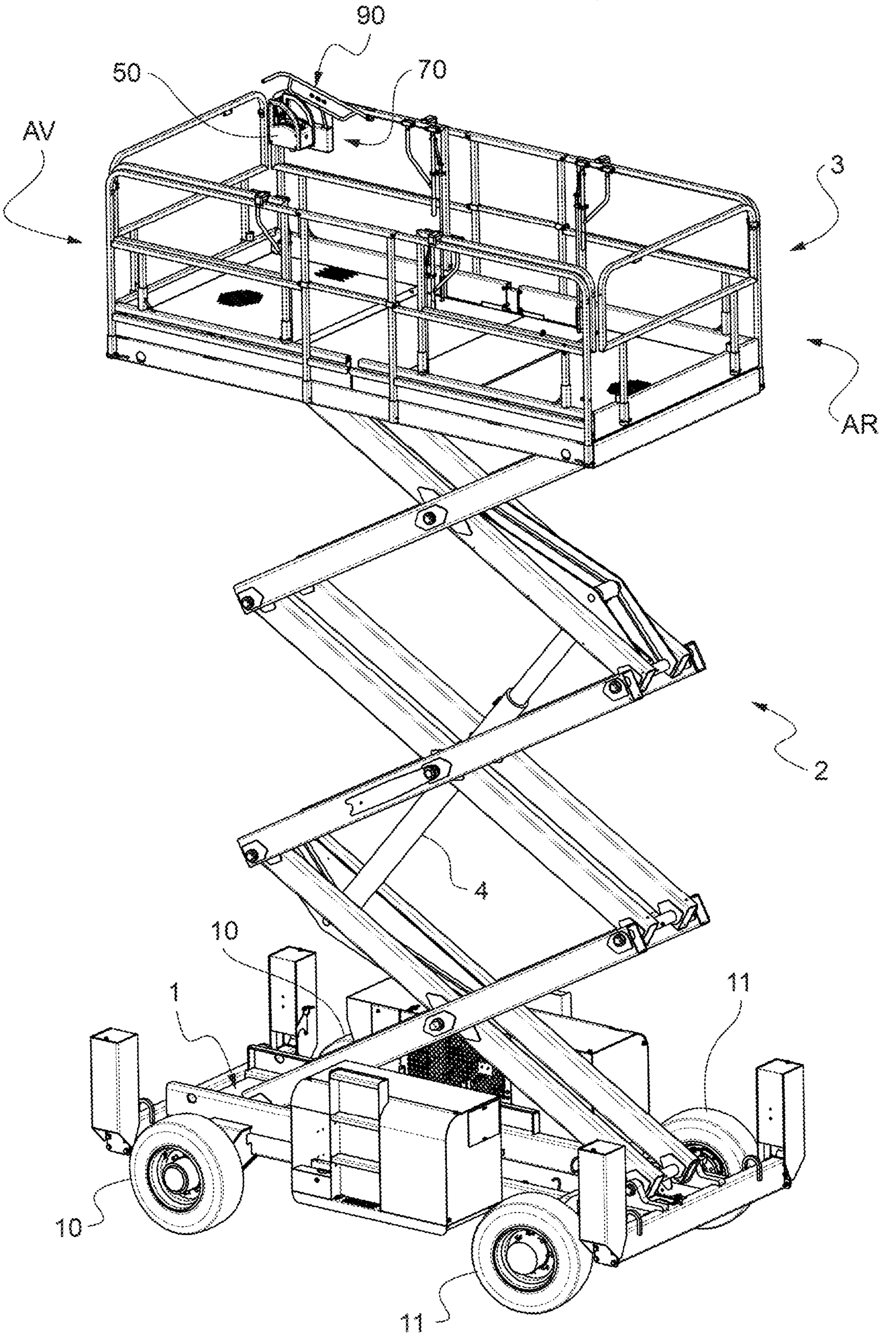

As can be seen in FIG. 2, the aerial work platform is a scissor lift. The lifting mechanism 2 is therefore a scissor lifting mechanism: this type of lifting mechanism is known per se. It consists of beams hinged in the middle in a scissor-like manner, these scissor mechanisms being mounted one above the other by their ends which are pivotally connected in order to reach the desired working height. The scissor lift mechanism can be extended and retracted by one or, alternatively, several hydraulic cylinders 4 to raise and lower the working platform 3.

Alternatively, the invention also relates to vertical mast aerial work platforms. Vertical mast aerial work platforms are known per se. Their lifting mechanism is designed as an extendable mast with vertical parts that slide on or in each other to extend vertically to the desired working height. Their lifting mechanism sometimes comprises a turret on which the vertical sliding parts are mounted, the turret being pivotally mounted on the chassis about a vertical axis so that the orientation of the working platform relative to the chassis can be varied. The working platform is mounted to the upper vertical part either fixedly or by means of a pendulum arm—i.e., an arm articulated to the vertical mast around a horizontal axis—in order to give the user more flexibility to reach the working position.

More generally, the invention relates to any other type of aerial work platform, regardless of the type of lifting mechanism of the working platform, in particular aerial work platforms having a tiltable telescopic mast to support the working platform.

The working platform 3 is provided with a platform extending horizontally when the aerial work platform is placed on a horizontal ground, this platform forming a floor 30 for receiving one or more persons on board and possibly materials. It is surrounded by a guardrail 40 to prevent people from falling off the working platform 3.

As can be seen in FIG. 1, the guardrail 40 comprises four sections 41 to 44 each corresponding to a respective side of the working platform 3 and the floor 30.

In this example, the working platform 3 is extensible in length. For this purpose, the floor 30 comprises a fixed main part 32 mounted on the lifting mechanism 2. The main fixed part 32 supports a respective sliding part 33 and 34 towards the front side (AV) and towards the rear side (AR). This allows users to vary the length of the working platform 30.

Correspondingly, each side section 41 and 42 of the guardrail 40 comprises, firstly, a fixed side part 41*a*, 42*a* mounted on the fixed main part 31 of the floor 30 and, secondly, a front side portion 41*b*, 42*b* mounted on the front sliding part 33 of the floor 30 and a rear side portion 41*c*, 42*c* mounted on the rear sliding part 34 of the floor 30. Furthermore, the front section 43 of the guardrail is mounted on the front sliding part 33 of the floor 30 while the rear section 44 of the guardrail 40 is mounted on the rear sliding part 34 of the floor 30.

Alternatively, the working platform 3 is extendable in length at only one of its front and rear sides, and thus comprises only one of the sliding parts 33 or 34 of the floor 30. In this case, the parts of the guardrail 30 on the other of its front and rear sides are mounted on the fixed main part 32 of the floor 30. According to another embodiment, the working platform 30 is of fixed length. In this case, the floor 30 has no sliding parts 33 and 34 and the entire guardrail 40 is mounted on the main part 32.

Figure 6:
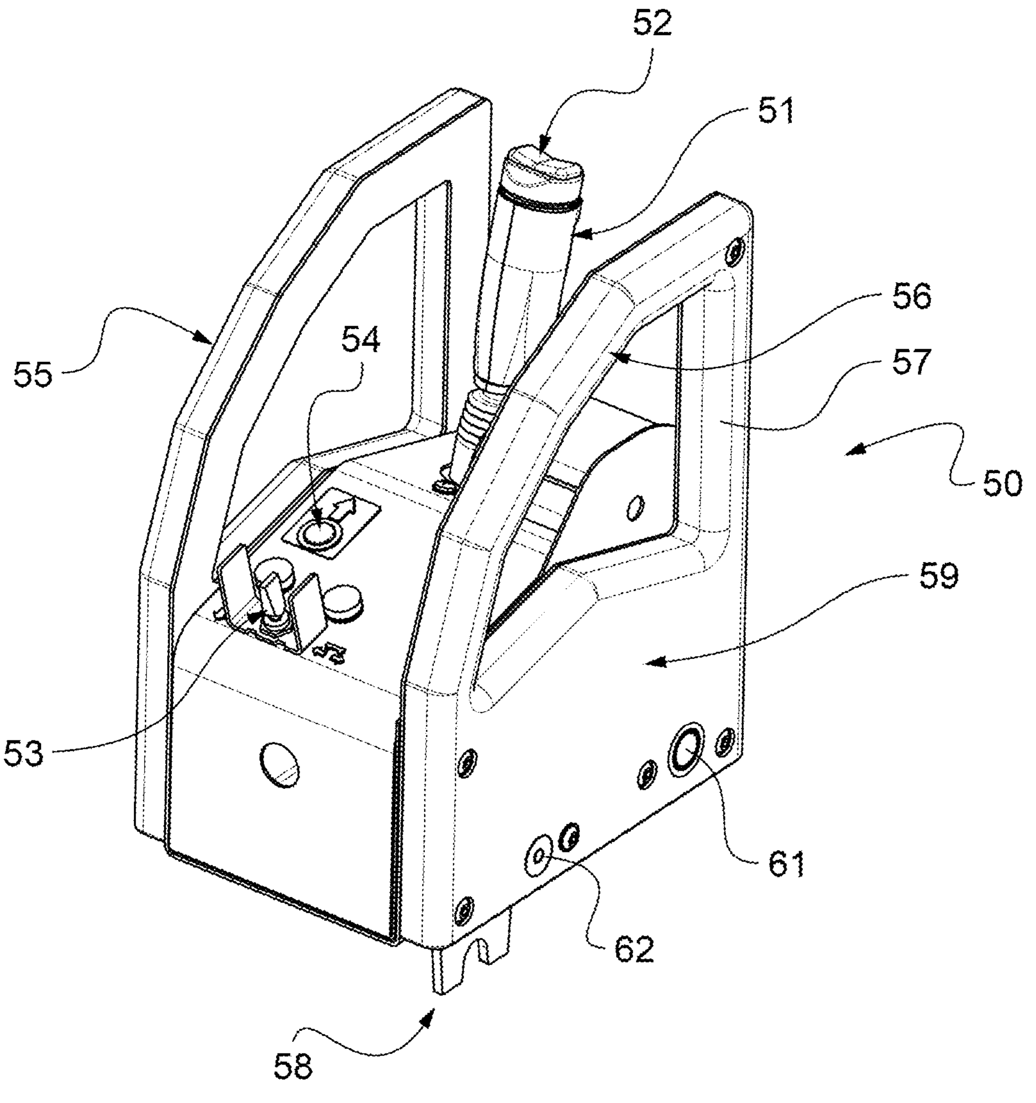
Figure 7:
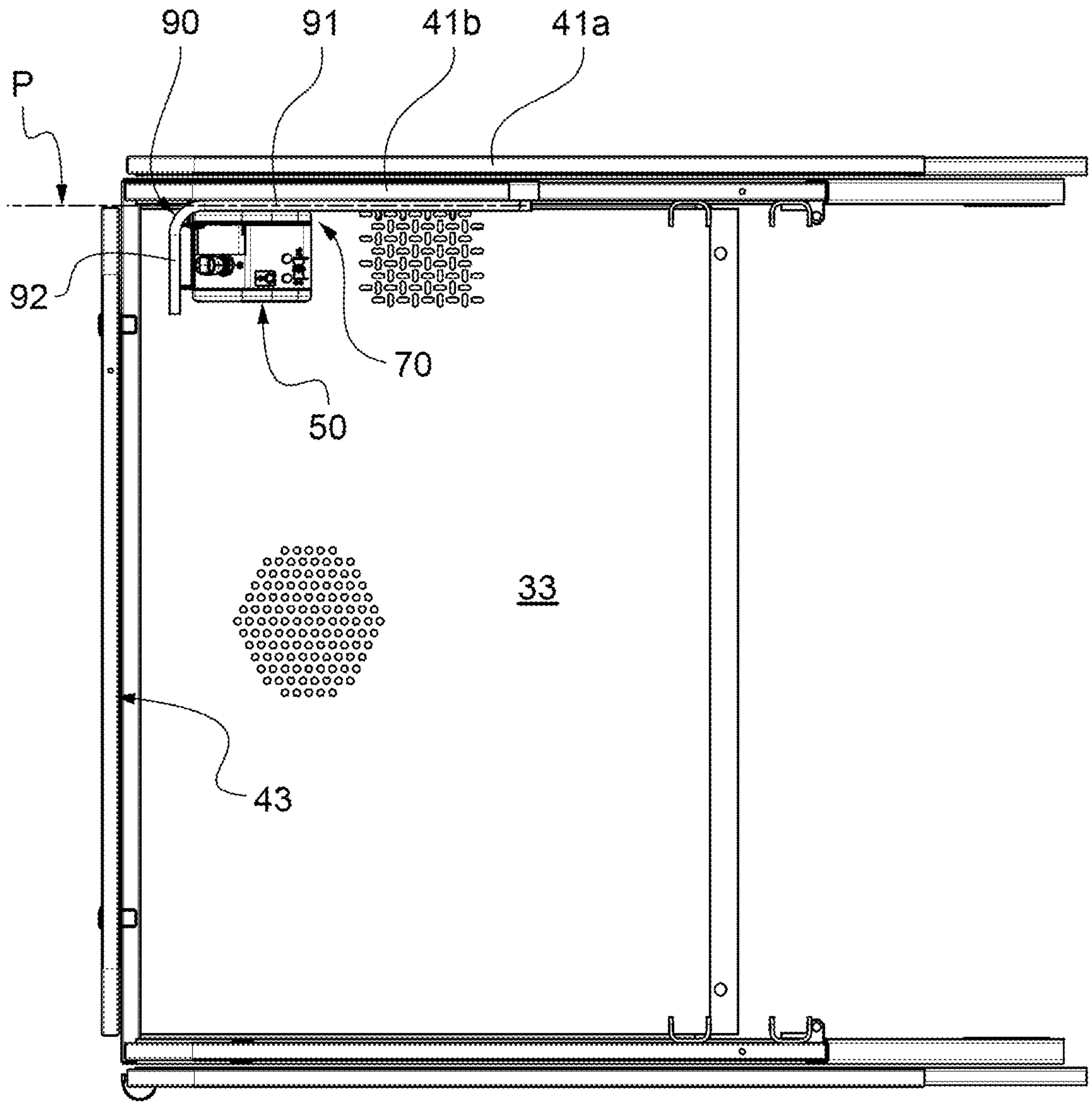

The aerial work platform includes a control panel 50 shown in FIG. 6. The control panel 50 is provided with manually operated control members which allow an operator to move the working platform 3 in height to reach the desired working position and to lower it onto the chassis 1, as well as to move the aerial work platform along the ground if relevant.

In this example, a switch 53 is used to select the type of movement that can be commanded by means of a control handle 51 from amongst the movement of the aerial work platform along the ground and the movement of the working platform 3 in height. The control handle 51 is used to cause execution of the selected type of movement: it can be tilted forward and backward to, according to the case, raise or lower the working platform 3 or move the aerial work platform forward or backward along the ground. Alternatively, the control handle 51 is replaced by two push buttons or other suitable manually operated control members.

For safety reasons, it is preferable to provide a manually actuated validation member, known as a deadman, for example a push button, so that a movement commanded, in our example, by tilting the control handle 51 is only executed if the validation member is actuated simultaneously. In this case, the validation member in the form of a push button—not visible in the figures—can be arranged on the front of the control handle 51, but alternatively, it can be arranged elsewhere on the control panel 50. It is preferably provided to be operated by a finger of the hand with which an operator manipulates the control handle 51.

A button 52 of the push-button type tilting towards two opposite sides is arranged on the top of the control handle 51—or elsewhere on the control panel 50—and allows the orientation of the steered wheels to be changed, in this case the front wheels 10 or, alternatively, the rear wheels 11, or even both the front wheels 10 and the rear wheels 11. Alternatively, the button 52 is replaced by two push buttons or by one or more other suitable manually operated control members.

The control panel 50 is provided with a wired connection—not shown—or alternatively a wireless connection—with a control circuit—not shown—preferably housed under, in or on the chassis 1, which controls the power devices, in particular the motorization and the hydraulic cylinder(s) 4, according to the orders received from the control panel 50.

The control panel 50 is adapted to be hand-held or mounted on the working platform 30, at the choice of the operator. The possibility of holding the control panel in the hand allows the operator to control the aerial work platform from any location on board the working platform 3, or possibly from the ground.

In order to be hand-held, the control panel 50 preferably comprises on each lateral side a hoop 55, respectively 56, forming a handle. Thus, an operator can hold the control panel 50 with any hand while manipulating its controls members with the other hand. Alternatively, the control panel 50 has a single handle or the handle or handles can have a different configuration. To facilitate holding the control panel 50 by hand, it is preferably made compact, for example with a width of less than or equal to 30 cm, or even more preferably less than or equal to 20 cm. For the same purpose, its weight is preferably chosen to be sufficiently low, preferably less than 10 kg. But its width is preferably at least 10 cm for the purpose of housing its components and members. Its weight is usually at least 1 kg, but more usually at least 2.5 kg, or even more than 3.5 kg, taking into account the material(s) of the housing and the components and parts it comprises.

Figure 3:
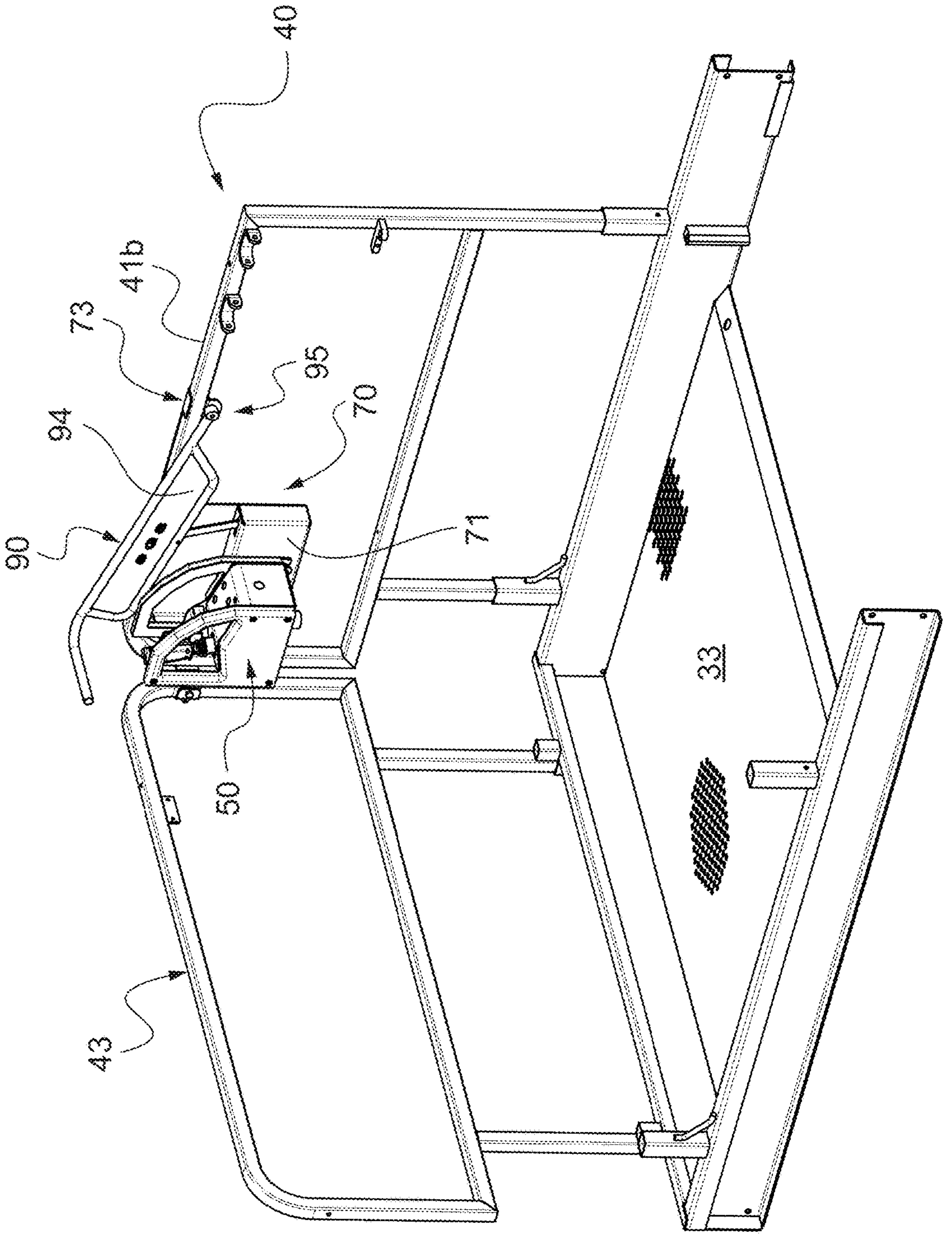

As illustrated in FIG. 3, the control panel 50 is adapted to be removably mounted on the working platform 3 by means of a protection device 70 which serves to protect an operator from being crushed against the control panel 50 or against an adjacent part of the guardrail 40.

The protection device 70 includes a bar 90 for detecting a situation where there is a risk of crushing an operator.

Figure 11:
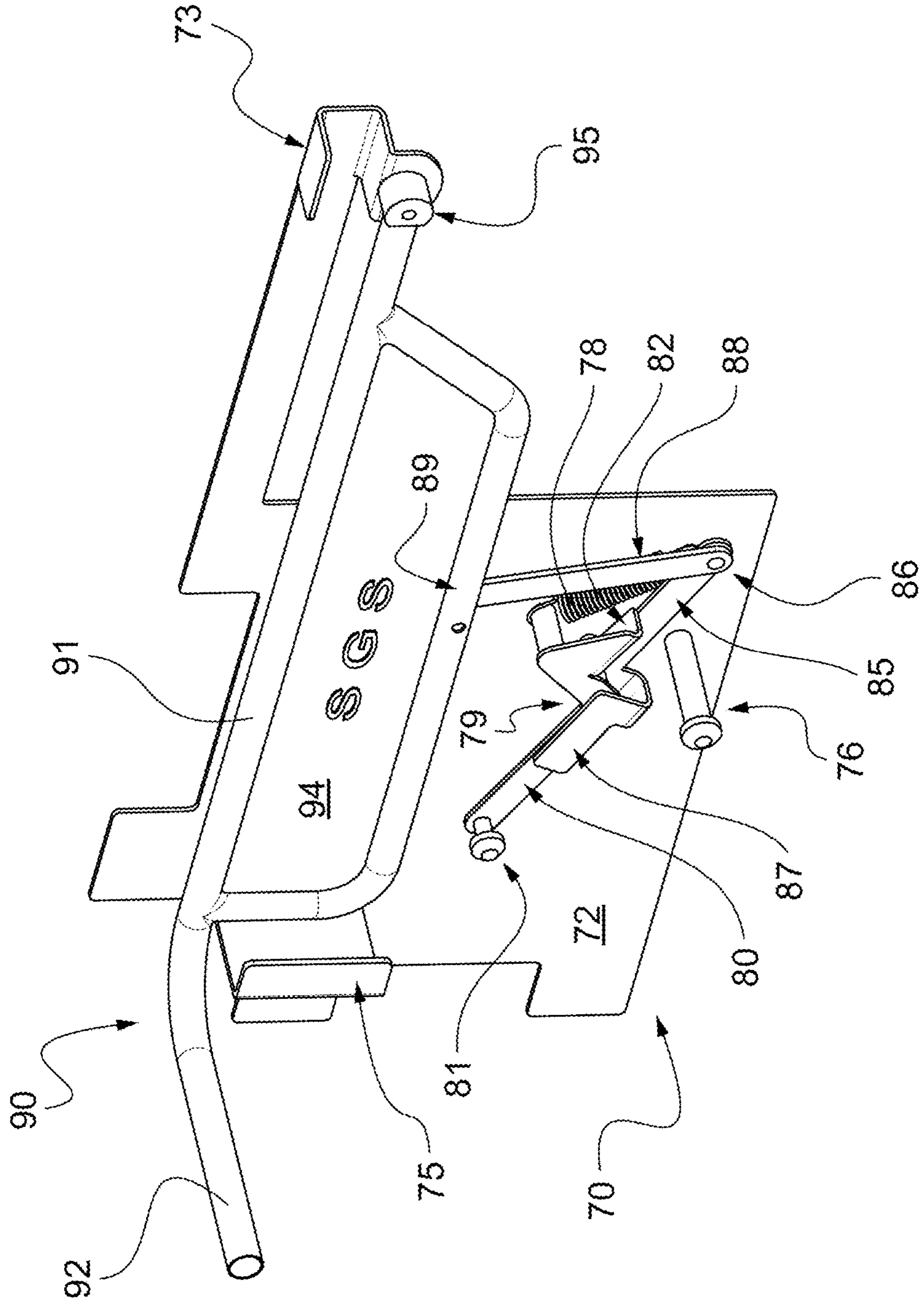

As best seen in FIG. 11 where a protective cover 71 is omitted, the protection device 70 comprises a support structure 72 on which the mechanical components constituting the protection device 70 are mounted. The support structure 72 is intended to be fixedly mounted to the guardrail 40. As a result, the mounting or dismounting of the protection device 70 of the guardrail 40 is facilitated since the protection device 70 can be pre-assembled independently of mounting or dismounting operations on the guardrail 40.

In this example, the support structure 72 is made in the form of a cut sheet metal plate. The area of the top edge and of the front side of the sheet metal plate is used to position it, respectively, on an upper rail and on an upright of the guardrail 40. It also includes a U-shaped part 73 cooperating with the upper rail of the section **41*b* of the guardrail 40, which contributes to the positioning and to the holding-in-position of the support structure 72 on the guardrail 40. The holding-in-position of the support structure 72 on the guardrail 40 is carried out or completed by any suitable means such as screws or welds. Preferably, however, the protection device 70** can be dismounted with suitable tools without risk of damage, for example, by using a screwdriver or a wrench, particularly for maintenance or replacement purposes.

In this case, the protection device 70 is fixedly attached to a predetermined location of the guardrail 40, namely to the right lateral part **41*b* of the guardrail 40 in the vicinity of the front section 43, as this is the most convenient position for a right-handed operator on board the working platform 3** to operate the aerial work platform.

Alternatively, it can be provided that the protection device 70 can also be removable from the guardrail 40 to allow users of the aerial work platform to selectively mount the protection device 70 at one of a plurality of predetermined locations of the guardrail 40 suitable for this purpose. In the latter case, it can advantageously be provided that the mounting and dismounting of the protection device 70 with respect to the guardrail 40 can be carried out manually without tools, for example by using manually operated quick-locking or quick-clamping devices.

Alternatively, it can be provided that a number of protection devices 70 are mounted to different locations of the guardrail 40, for example a second one can be arranged on the left side section **42*c* close to the rear section 44**, which can be useful when maneuvering the aerial work platform on the ground towards in the rearward direction.

The control panel 50 is preferably devoid of means allowing it to be mounted on or hung to the guardrail 40 or to any part of the working platform 3 other than the or a protection device 70. Thus, the control panel 50 can only be mounted on the working platform 3 via the or a protection device 70. In this way, the operator benefits from the anti-crush protection provided by the protection device 70 each time he uses the control panel 50 in the state mounted on the working platform 3 because he will be standing in the protection area provided by it.

Figure 4:
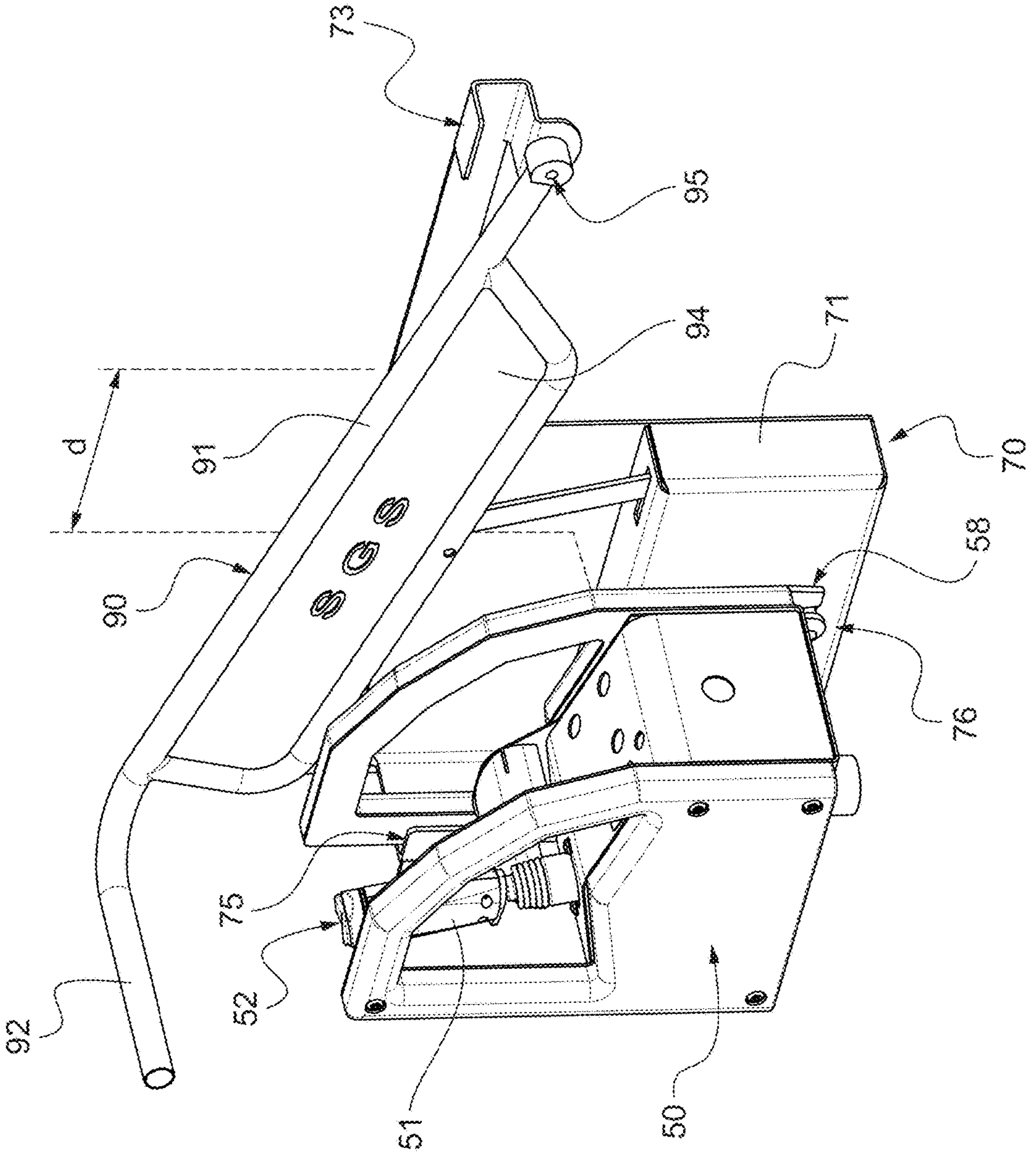
Figure 5:
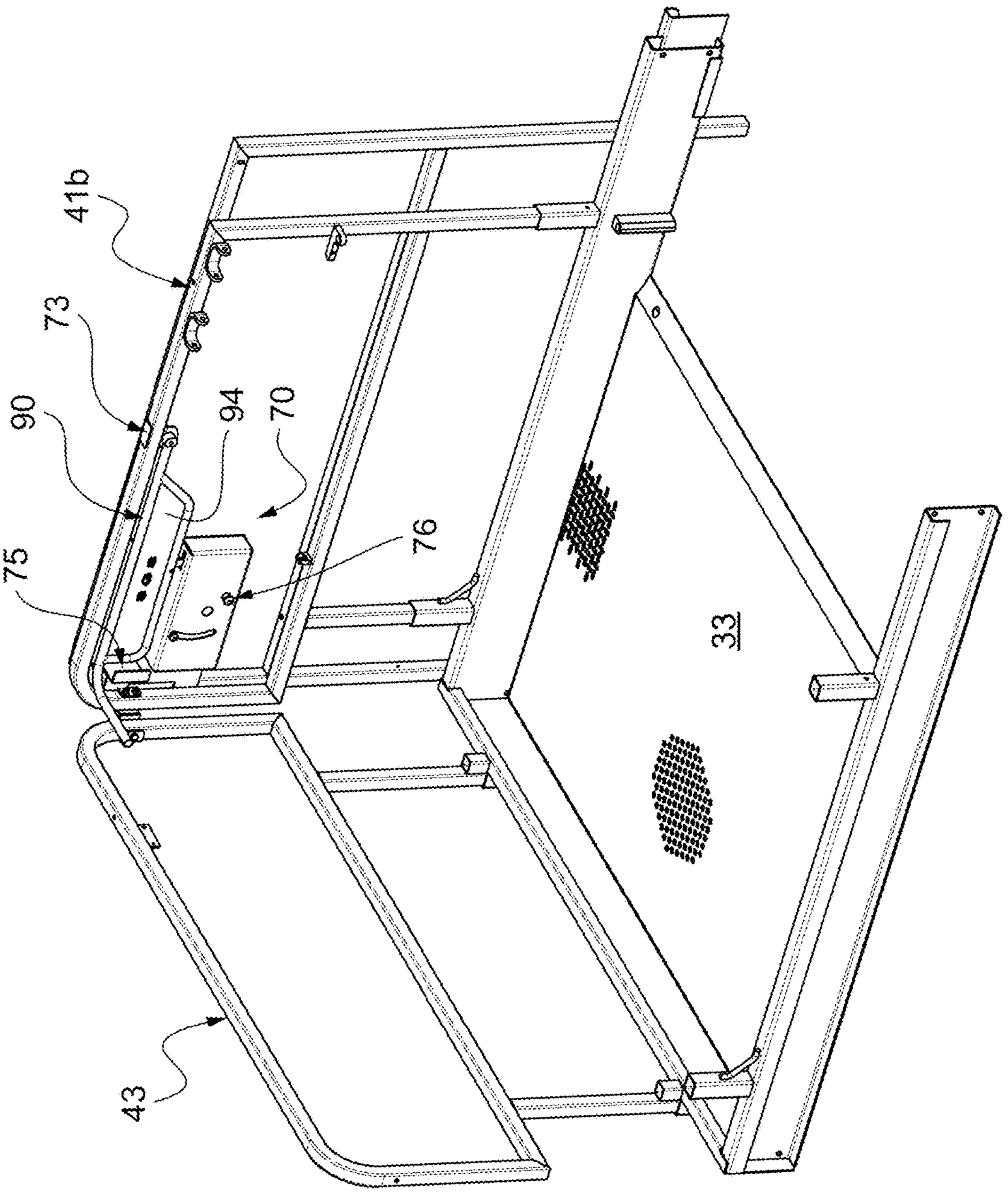

For the purpose of removably mounting the control panel 50, the protection device 70 comprises a mounting system comprising a U-shaped part 75 making part of the support structure 72: see FIGS. 4, 5 and 11. The U-shaped part 75 is provided to receive a rear upright 57 of the control panel 50 which supports the hoop 56 forming a handle. The mounting system further comprises a pin 76 fixedly mounted to the support structure 72 and having a free end with a retaining head projecting from the cover 71. This pin 76 is intended to be engaged by a notch of an element 58 fixedly arranged in the lower part of the control panel 50 and projecting downwards. The U-shaped part 75 and the pin 76 with a retaining head thus enable the control panel 50 to be positioned and held in position on the protection device 70 in a predefined position.

Figure 14:
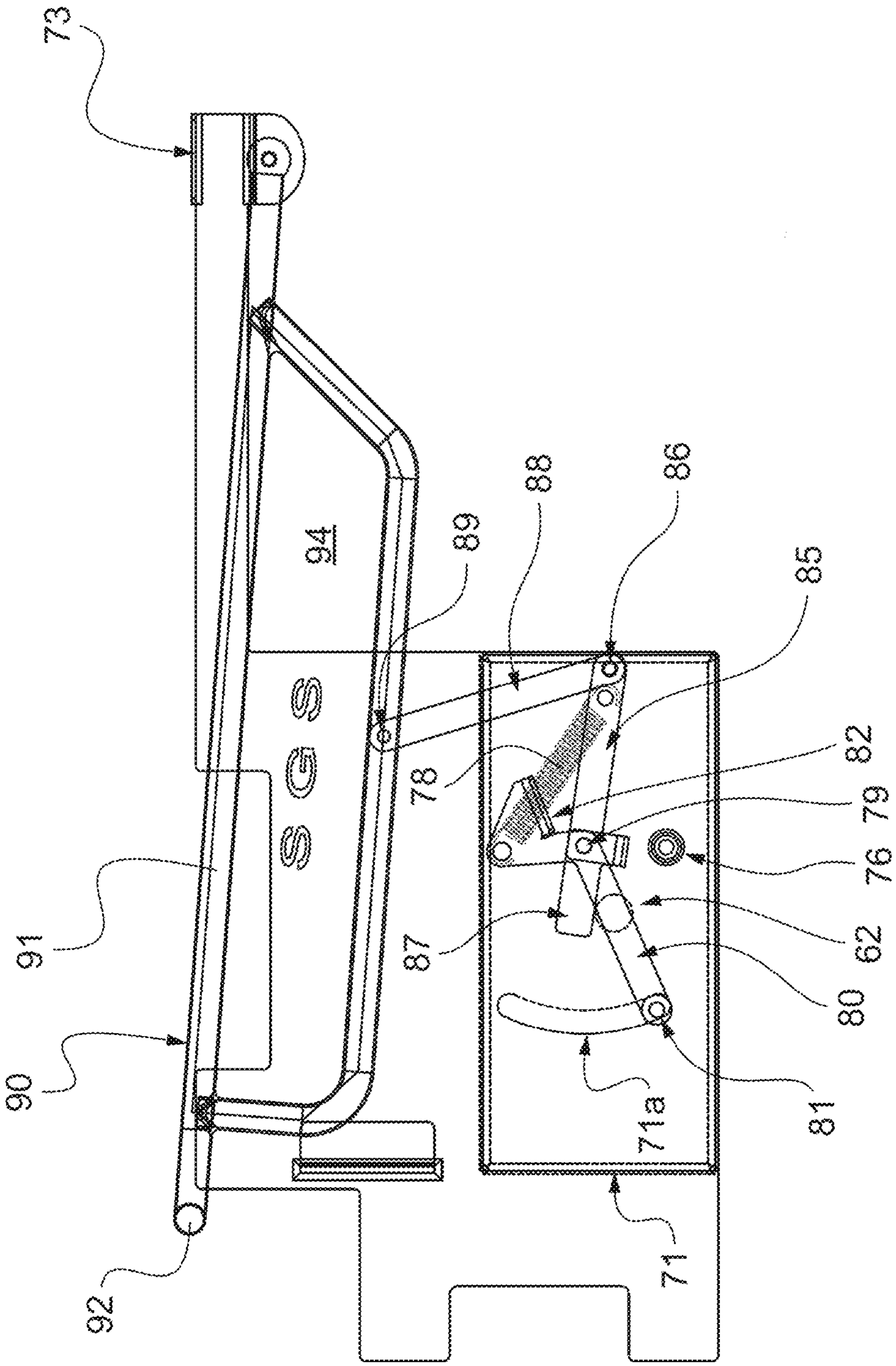
Figure 15:
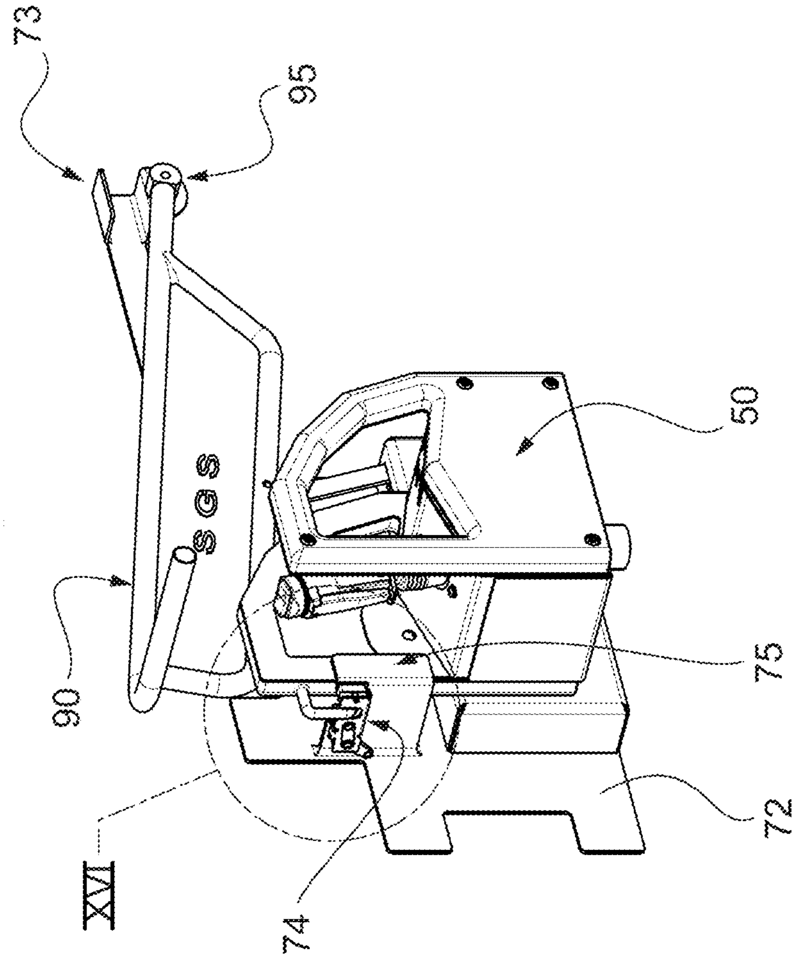
Figure 16:
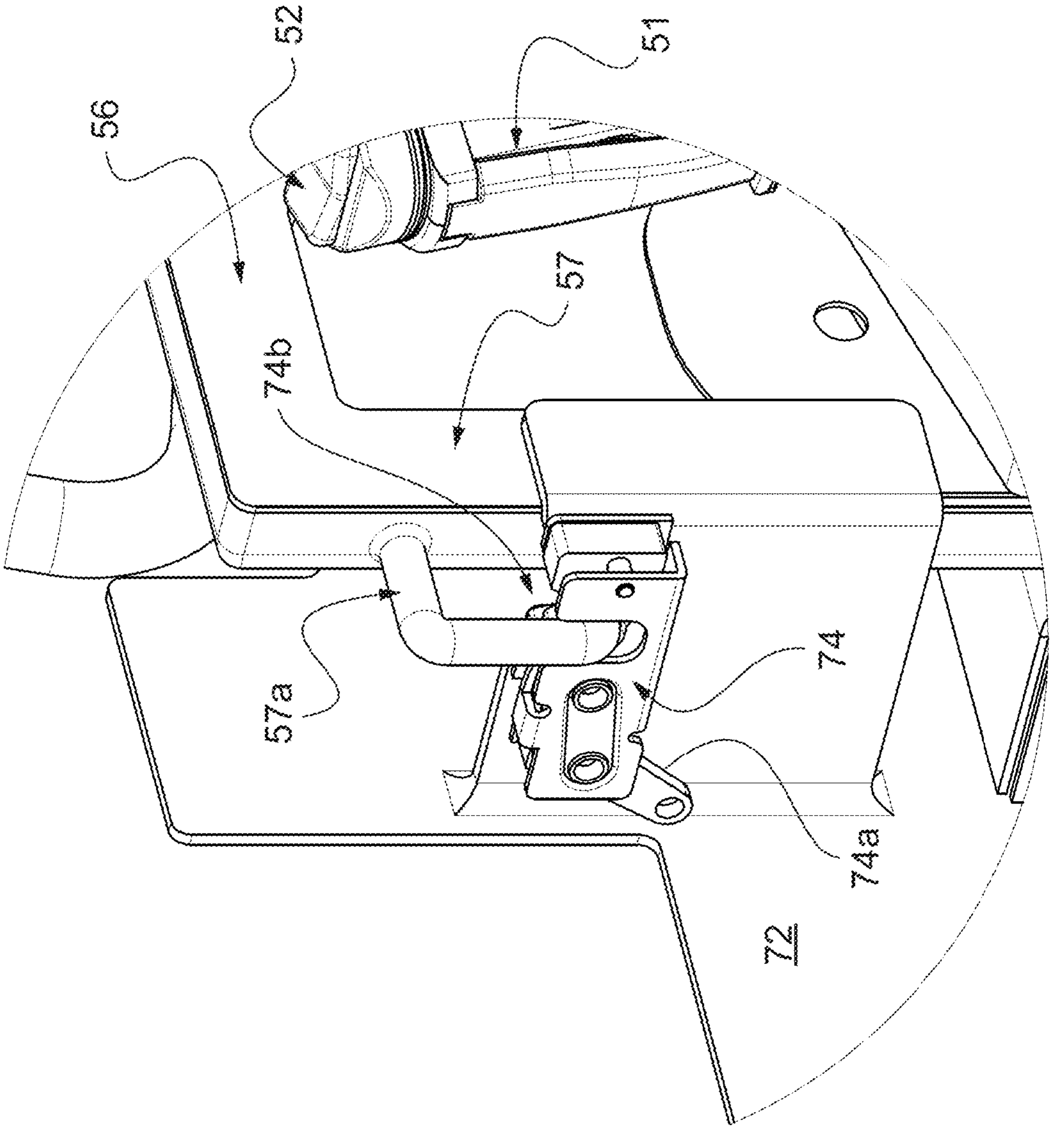

The holding-in-position of the control panel 50 on the protection device 70 is preferably supplemented by any suitable manually operable locking system. For convenience, the locking system has not been shown in FIGS. 1 to 14, but an example is shown in FIGS. 15 and 16. In this example, the locking system comprises a lock 74 fixedly arranged to the protection device 70, preferably on the support structure 72, and is intended to cooperate with a member **57*a* fixedly arranged on the control panel 50. In the illustrated example, the lock is arranged on the U-shaped part 75 of the support structure 72 on the bottom wall of the U on the side opposite to the opening of the U. In this case, the member 57*a* is a U-shaped rod fixedly arranged at the rear of the upright 57 of the control panel 50 so as to form a closed loop. The lock 74 includes a slot which can be engaged by a portion of the rod forming the member 57*a*. The lock 74 includes a moving latch 74*b* which is preferentially translatable to move between a position protruding into the slot for retaining the member rod 57*a* therein and a retracted position allowing to insert and release the rod forming the member 57*a* from the slot of the lock 74. The latch 74*b* may be beveled so as to move to the retracted position under the action exerted on it by the rod forming the member 57*a* when it is inserted into the slot of the lock 74, which advantageously provides automatic locking. Unlocking is done manually. In this case, unlocking can be accomplished by manually operating a bar 74*a* to move the latch 74*b* to its retracted position. According to another example not shown, the locking system comprises an indexing finger integral with the protection device 70 and resiliently constrained to project to engage a corresponding recess of the control panel 50**. The unlocking is done by manual operation of the indexing finger while it can be foreseen that the locking is done automatically similar to the case of the previous example.

It will be understood that the mounting system just described is only an example and can be realized in any other suitable way.

As can be seen in FIG. 3, when mounted to the protection device 70, the control panel 50 is held in place in a predefined mounting position adjacent to the bar 90 and a section of the guardrail 40, in this case adjacent to the right-side part 41*b* of the guardrail 40 near the front section 43. In its mounted position, the control panel 50 is oriented so that the operator normally stands in front of the control panel 50 on the side opposite to the section 43 and next to section 41 of the guardrail 40: see FIG. 8. The exemplified control panel 50 is thus oriented so that the direction of travel on the ground of the aerial work platform is consistent with the forward or backward tilt of the control handle 51 to command travel.

The bar 90 for detecting a situation where an operator is at risk of being crushed is generally L-shaped. The bar 90 can be made of any suitable material such as a metallic material, a plastic material or a composite material. When the control panel 50 is mounted on the protection device 70, the bar 90 is held in a holding position which is illustrated in FIGS. 1 to 4, 8 and 13. In this holding position, the bar 90 extends both close to the control console 50 and to an adjacent part of the section 41 of the guardrail 40.

Figure 8:
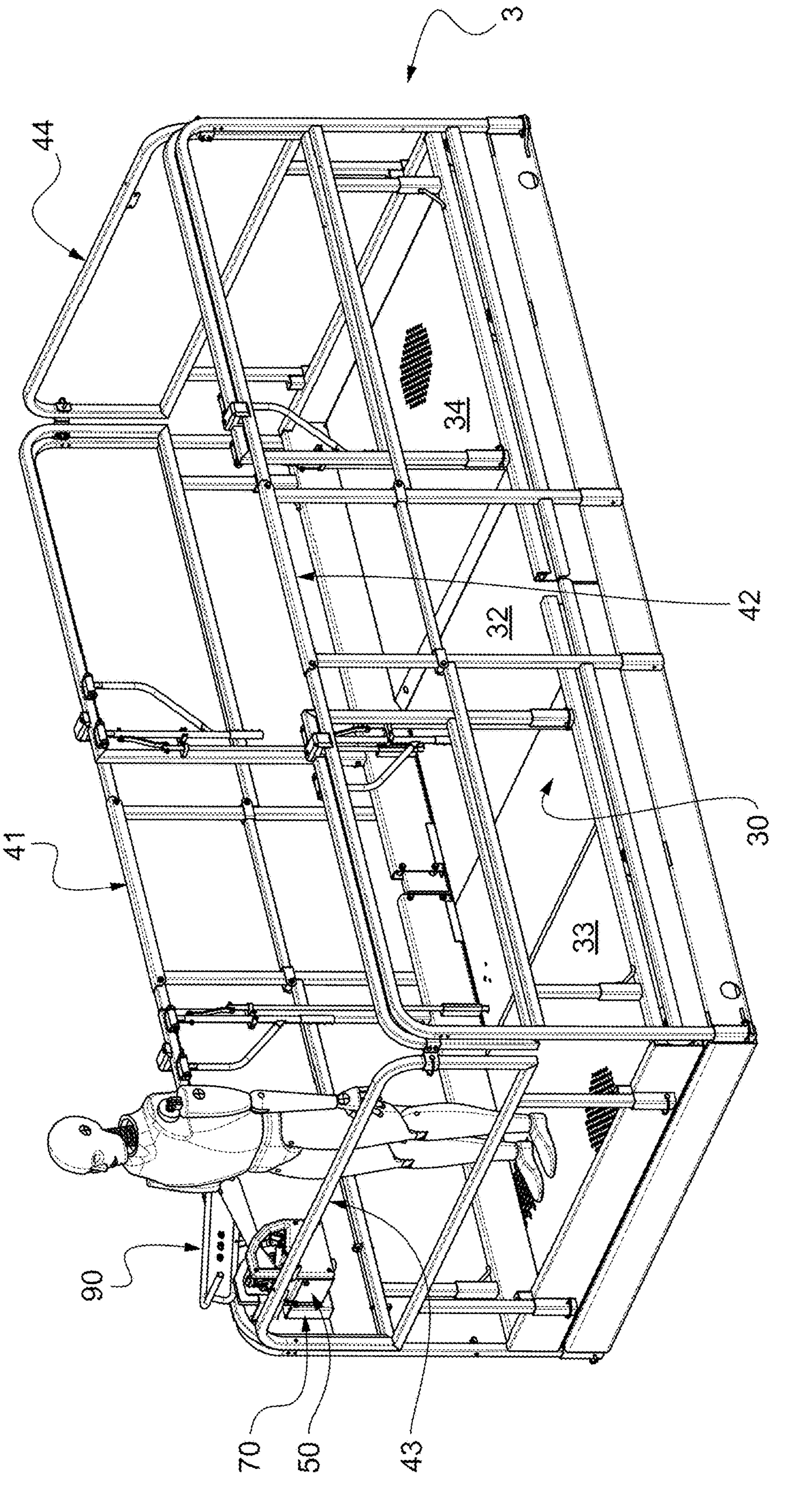

Specifically, the longer arm 91 of the bar 90 is located laterally from a lateral side 59 of the control panel 50 that is oriented towards the section 41 of the guardrail 40. The arm 91 of the bar 90 extends in a plane P perpendicular to the floor 30 of the working platform 3 and which is substantially parallel to the upper rail of the section 41 of the guardrail 40: see FIG. 7. In the holding position of the bar 90, a preponderant portion of the arm 91 extends locally at a level above the adjacent section 41 of the guardrail 40, i.e., at a level which is above the upper rails of the right-side part 41*b* and the fixed side part 41*a* of the section 41 which are in this case at the same height. For convenience, we will refer to the section 41 of the guardrail 40 without further mentioning parts 41*a* and 41*b* when discussing, in the following, the positioning of the bar 90 with respect to the guardrail 40 or the risk of an operator being crushed against the guardrail 40 in the area of the protection device 70. This portion of the arm 91 extends beyond the control panel 50 towards the rear of the working platform 3. In other words, it extends laterally to the operator who is standing at the control panel 50 as seen in FIG. 8. Preferably, this portion extends above the adjacent section 41 of the guardrail 40 over a distance 'd' equal to at least 25 cm, more preferably at least 35 cm, the distance 'd' being measured in the plane P parallel to the floor 30 of the working platform 3 from the control panel 50 towards the rear of the working platform 3: see FIG. 4. Inversely, the distance 'd' is preferably less than or equal to 120 cm, and more preferably less than or equal to 80 cm, in order to leave most of the section 41 of the guardrail 40 available to support or place materials on it without the risk of unintentionally triggering of the crush protection device.

In its holding position, the shorter arm 92 of the bar 90 extends above the control panel 50. More particularly, it extends transversely, preferably perpendicularly, to the section 41 of the guardrail 40 and preferably parallel to the floor 30 of the working platform 3. The arm 92 extends above the control panel 50 preferably across substantially the entire width of the control panel 50.

More generally, the bar 90 can have a more complex shape, but it is advantageous that it has a L-shape under orthogonal projection on the floor 30 of the working platform 3 so that the parts corresponding to the two legs of the L extend generally as just described.

The bar 90 is movably mounted on the support structure 72 so as to be movable downwards, i.e., towards the floor 30 of the working platform 3 while being biased towards its holding position. As a result, the portion of the arm 91 located in the holding position of the bar 90 at a level above the upper rail of the section 41 has the possibility to move towards the upper rail by lowering its level. Similarly, the arm 92 that extends in the holding position of the bar 90 above the control panel 50 has the possibility to lower toward the control panel 50.

In this case, the bar 90 is pivotally mounted to the support structure 72 by the free end 95 of the arm 91 about an axis parallel to the floor 30 and perpendicular to the upper rail of the section 41 of the guardrail 40. As a result, the arm 91 moves in the plane P. Alternatively, the bar 90 is pivotally mounted to the guardrail 30 independently of the support structure 72. The use of a pivot link is advantageously simple to implement and reliable with little risk of gripping. Alternatively, the bar 90 is movably mounted by another type of connection, such as a translational mounting perpendicular to the floor 30 of the working platform 30.

Figure 9:
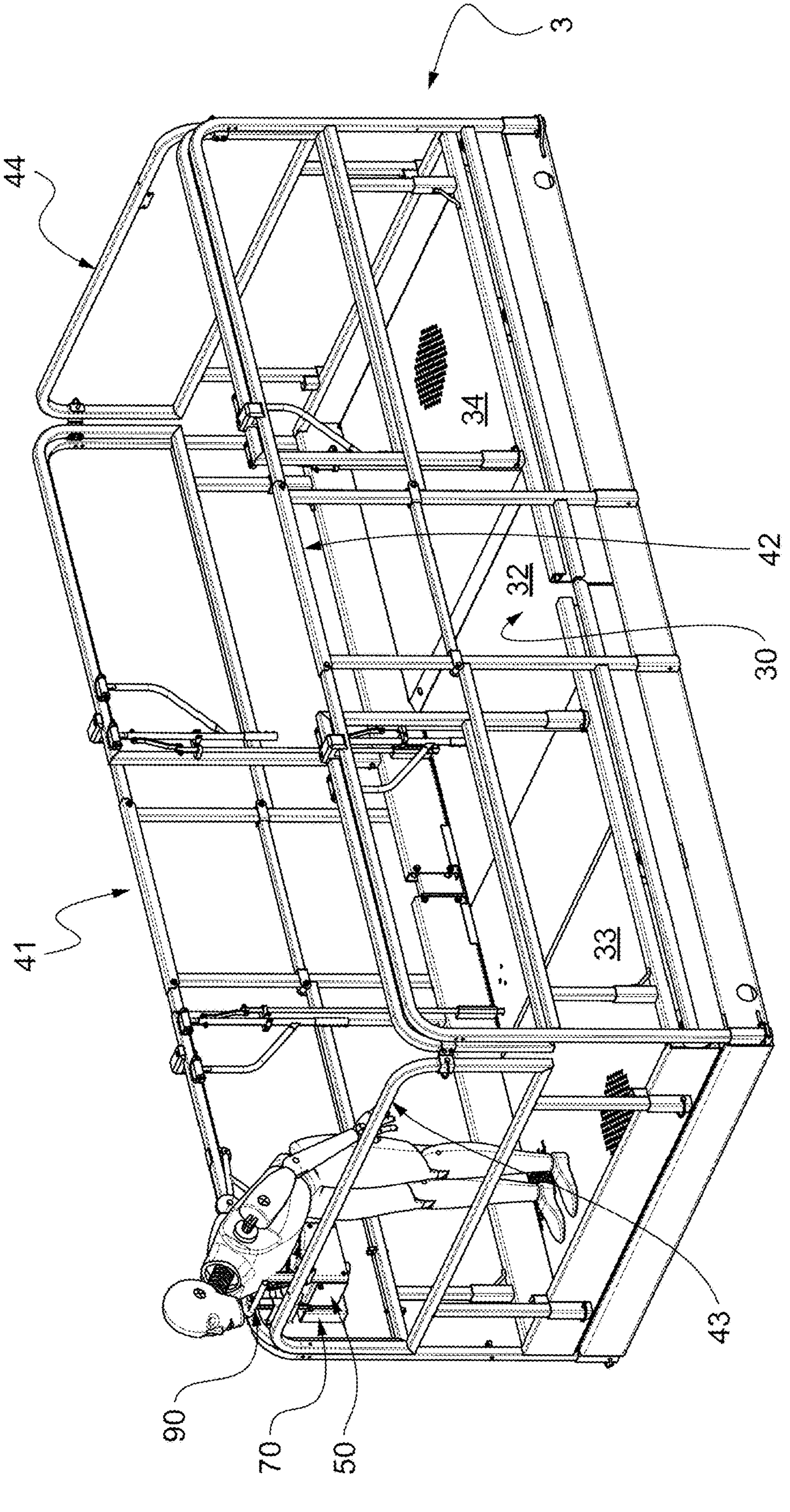

In normal use, the operator does not exert any action on the bar 90 as illustrated in FIG. 8: arm 91 of the bar 90 extends next to the operator while arm 92 extends between the operator and the control panel 50. In contrast, during a displacement of the working platform 3 caused by its lifting or by the displacement of the aerial work platform on the ground, the operator, standing at the control panel 50 mounted on the protection device 70, can be accidentally hit by an obstacle outside the aerial work platform so as to be pushed towards the control panel 50. In this case, the operator's body is first pushed against the arm 92 of the bar 90 before the operator comes into contact with the control panel 50. This situation is illustrated in FIG. 9.

Figure 10:
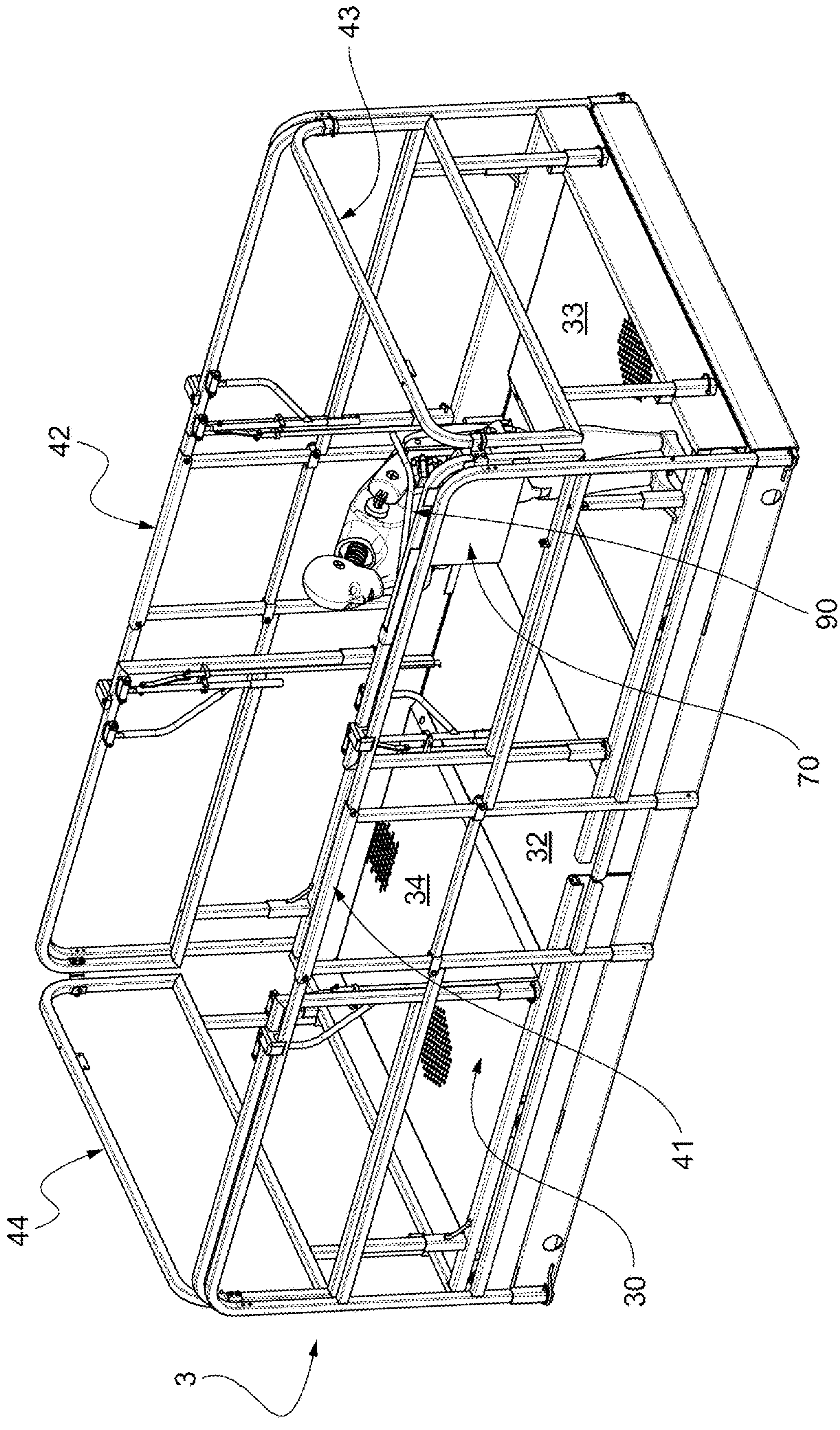

Similarly, in the event that the operator is leaning over the section 41 of the guardrail 40, for example to look at the orientation of the wheels 10 or 11 of the aerial work platform, and is hit by an external obstacle during the lifting of the working platform 3, his torso is pushed against the portion of the arm 91 of the bar 90 which extends at a level above the upper rail of the section 41 of the guardrail 40 before coming into contact with the upper rail. This situation is illustrated in FIG. 10.

In both cases, the bar 90 is pushed by the operator towards the floor 30 of the working platform 3, the arm 91 approaching the upper rail of the section 41 of the guardrail 40 and the arm 92 approaching the control panel 50. This displacement of the bar 90 is detected by a sensor—described in detail later—before the operator is actually crushed against the control panel 50 or against the upper rail of the section 41 of the guardrail 40. As a result of the detection, the control circuit of the aerial work platform stops the current movement, i.e., the lifting of the working platform 30 or the movement of the aerial work platform along the ground as the case may be. Therefore, the protection device 70 prevents the operator from being crushed.

In order to take into account the delay in the effective stopping of the current movement due in particular to inertia, it is preferable that the bar 90 has a latitude of movement beyond the detection position during which the arm 92 remains at a distance above the control panel 50 and a preponderant part of the portion of the arm 91 remains at a level higher than that of the upper rail of the section 41 of the guardrail 40.

Furthermore, it is preferable that the detection of the movement by the sensor occurs only after a predetermined initial movement sufficient to avoid an unintentional stop of the current movement if, in the absence of a crushing risk situation, the operator inadvertently presses on the bar 90

As best seen in FIGS. 3 and 4, the bar 90 is provided with a screen 94 which is arranged under the arm 91 and extends in the plane P—in other words, parallel to the section 41 of the guardrail 40—towards the floor 30 of the working platform 3. It is dimensioned so as to close the passage between the upper rail of the section 41 of the guardrail 40 and the portion of the arm 91 which is situated above the latter when the bar 90 is in its holding position, this being the case for a preponderant part of the length of the said portion of the arm 91 of the bar 90, and more preferably over substantially all of this length. This screen prevents any object from being placed between the arm 91 and the upper rail of the section 41, which could have the effect of preventing the bar 90 from moving. The screen 94 preferably has a continuous flat surface shape, i.e., without any opening, in order to obstruct the passage of any object. It can be made from sheet metal or from a suitable plastic material. Alternatively, the screen 94 can be in the form of a grid with small perforations, preferably small enough to prevent the passage of a screwdriver shaft.

As illustrated in FIG. 5, it is advantageous that the bar 90 is placed in a lowered position when the control panel 50 is dismounted from the protection device 70. In this case, it rests on the side of the end of the arm 91 towards the arm 92 on the top of the U-shaped part 75. In the lowered position, the bar 90 extends entirely at a level lower than or equal to the level of the upper rail of the section 41 in the area of the protection device 70. In this position, the risk of hindering the handling of material on board the working platform 3 by the bar 90 is limited, and the risk of damage to the bar 90, or to the protection device 70 as a result, is also limited. It also ensures more compactness in height when transporting the aerial work platform, for example on a truck.

FIGS. 11 to 14 illustrate the deployment mechanism of the bar 90 for moving it between its holding position and its lowered position, as well as for allowing it to move downwardly from its holding position when it is pushed in that direction while the control panel 50 is mounted to the protection device 70. The cover 71 is omitted in FIG. 11 to make the mechanism visible. For the same reasons, it is drawn transparent in FIGS. 12 to 14. This mechanism comprises three connecting rods 80, 85 and 88 housed in the protection device housing 70 formed, in this example, by the support structure 72 and the cover 71.

The connecting rod 80 is pivotally mounted about a pin on the support structure 72 in 79, it being specified that the pin is hidden in FIG. 11. One end of the connecting rod 80 is provided with a pin, the free end of which has an actuating stud 81. This pin with the stud 81 protrudes out of the cover 71 through a curvilinear slot 71*a* in the cover: see also FIG. 5. At its opposite end, the connecting rod 80 has a stop surface 82 for cooperating with the connecting rod 85 so as to stop their relative pivoting in a pivoting direction.

The connecting rod 85 is pivotally mounted to the support structure 72 in 79 about the same pin as the connecting rod 80. A helical spring 78 is provided to resiliently urge the connecting rod 85 into abutment with the abutment surface 82 of the connecting rod 80. For this purpose, it is hooked by one end to the connecting rod 80 and by its other end to the connecting rod 85. One end of the connecting rod 85 is pivotally connected at 86 to one end of the connecting rod 88. The spring 78 is connected to the pivot pin between the connecting rods 85 and 88 for simplicity, but can be hooked elsewhere on the connecting rod 85. Alternatively, the spring 78 is a torsion spring performing the same function of abutting the connecting rods 80 and 85 against each other.

At its other end, the connecting rod 88 is pivotally mounted at 89 to the bar 90 either directly or indirectly through a structural member rigidly associated with the bar 90. In the illustrated example, the connecting rod 88 is pivotally mounted to a curved bar arranged under the arm 91 of the bar 90 and framing the screen 94.

Figure 12:
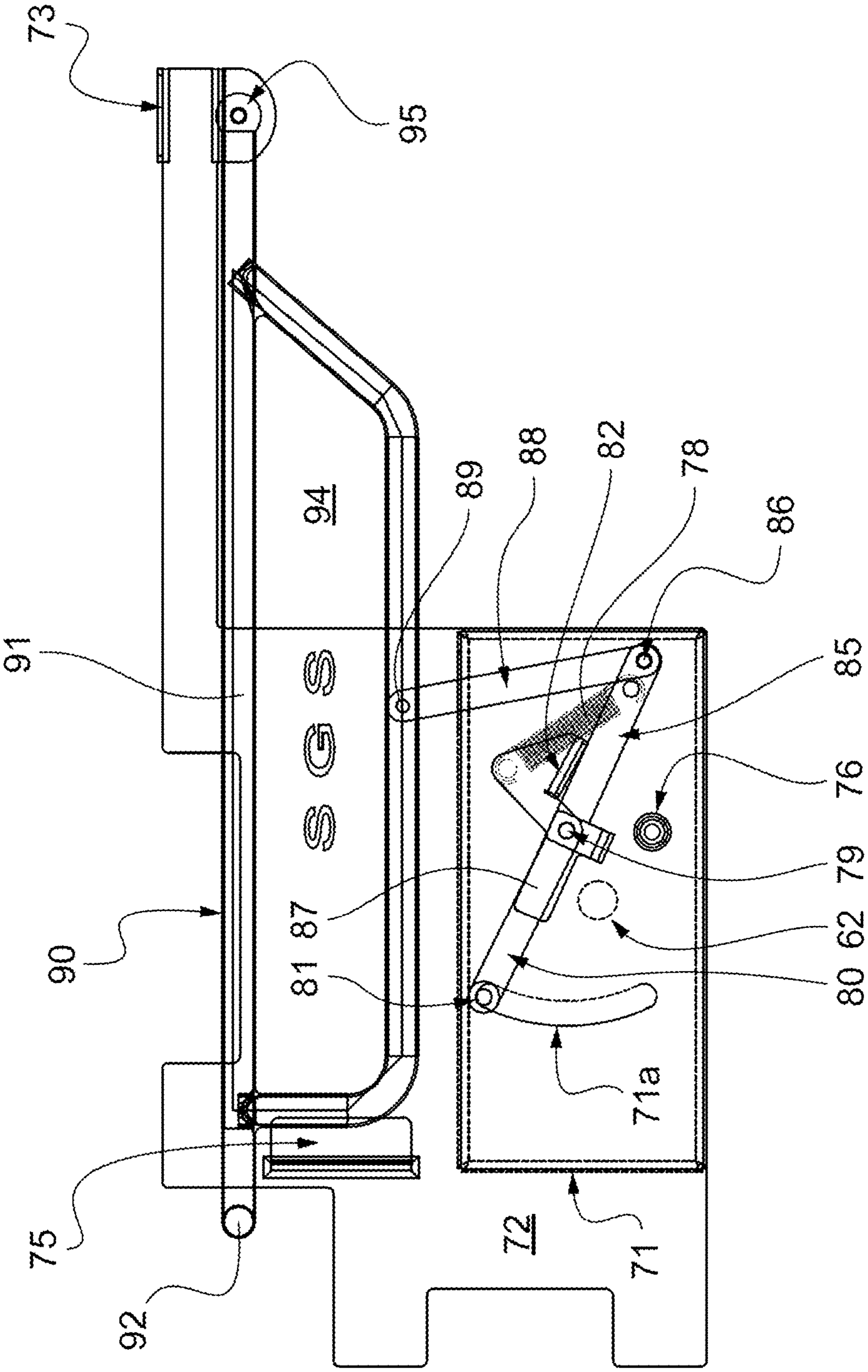

FIGS. 11 and 12 illustrate the position of the connecting rods and bar 90 when the control panel 50 is dismounted from the protection device 50. In this case, the bar 90 returns to the lowered position under the effect of gravity. And the connecting rods 80 and 85, abutting each other under the action of the spring 78, are tilted into a position in which the pin with actuating stud 81 is at the upper part of the curvilinear groove 71*a* of the cover 71.

Figure 13:
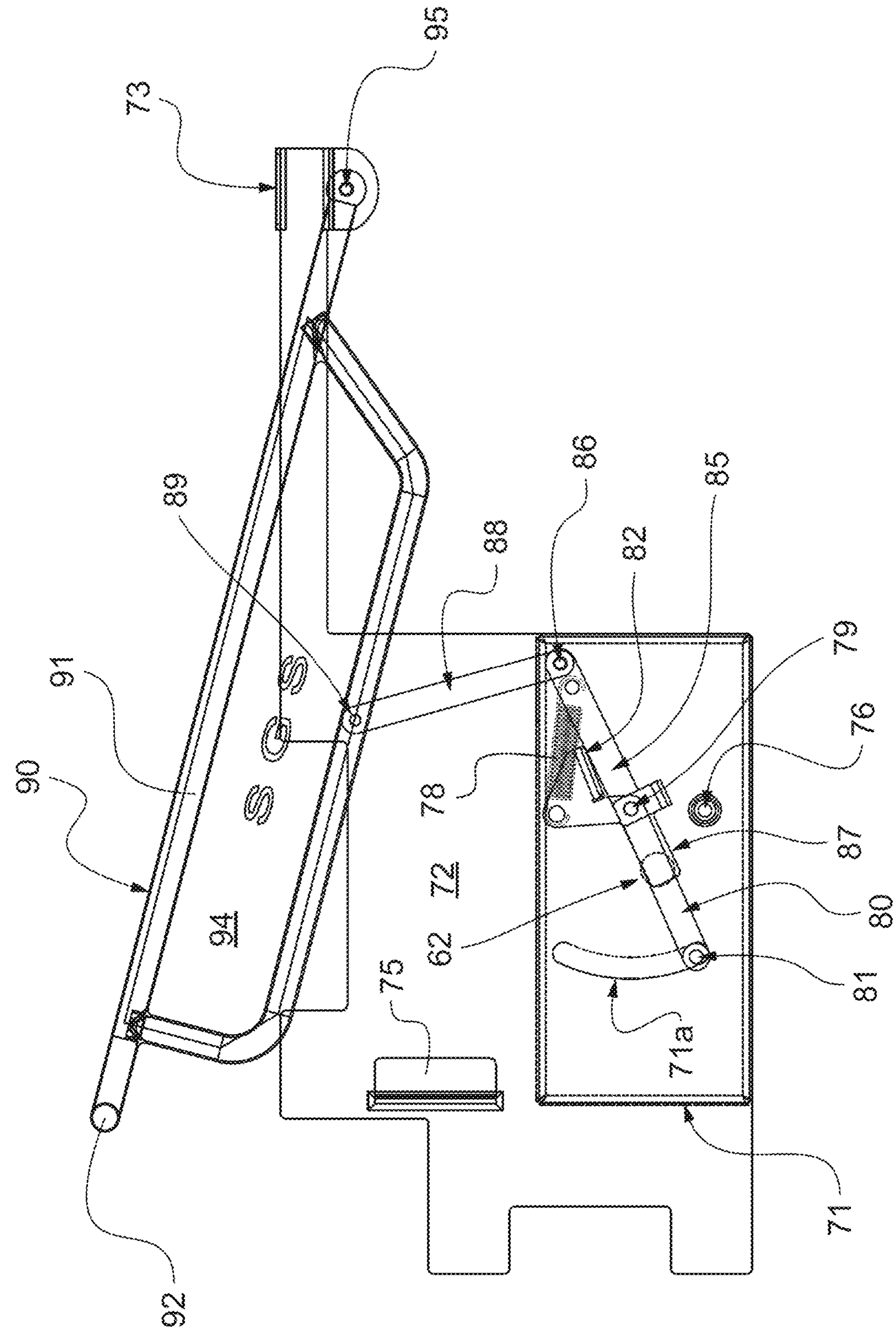

When the operator mounts the control panel 50 to the protection device 70 by engaging the upright 57 in the U-shaped portion 75 and by engaging the notch of the element 58 on the pin 76, the lower part of the control panel 50 pushes the actuating stud 81 downwards towards the floor 30 of the working platform 3. The connecting rod 80 thus pivots, and correlatively so does the connecting rod 85 due to the spring 78 holding the connecting rods 80 and 85 in abutment against each other. The end 86 of the bar 85 thus rises upwards, causing the bar 90 to pivot into the holding position via the connecting rod 88. FIG. 13 illustrates the position reached by the connecting rods and the bar 90—i.e., its holding position—when the control panel 50 is mounted to the protection device 70 in the absence of external thrust on the bar 90.

In the holding position shown in FIG. 13, the protection device is active. Therefore, if the bar 90 is pushed downwards towards the floor 30 of the working platform 3, in particular by the operator under the action of an obstacle hitting him, the bar 90 actuates the connecting rod 88 downwards, which has the effect of pivoting the connecting rod 85 against the bias of the spring 78. The connecting rod 85 then leaves the stop position against the stop surface 82 of the connecting rod 80, it being specified that the connecting rod 80 remains immobile due to the actuating stud 81 bearing against the lower part of the control panel 50 mounted on the protection device 70. The control panel 50 remains in its mounting position on the protection device 70 due to the manually operated locking system which locks it in position or, alternatively, under the effect of gravity as long as it is sufficient to counter the thrust of the connecting rod 80 generated by the action of the spring 78. FIG. 14 shows the new positioning of the connecting rods 85 and 88, as well as the bar 90 which has been pushed down.

This displacement of the connecting rod 85 is detected by a sensor, already mentioned, to allow the control circuit of the aerial work platform to stop the current movement, i.e., the lifting of the working platform 30 or the displacement of the aerial work platform on the ground as the case may be. In this example, it is an inductive sensor 62 arranged on the lateral side 59 of the control panel 50 oriented towards the protection device 70: see FIG. 6. This cooperates with a tab 87 of the connecting rod 85. When the bar 90 is in the holding position, the tab 87 is facing the inductive sensor 62.

This is illustrated in FIG. 13, where the position of the inductive sensor 62 is symbolized, although the control panel 50 is not shown.

The tab 87 of the connecting rod 85 gradually moves away from in front of the inductive sensor 62 as the connecting rod 85 pivots under the action of the movement of the bar 90 towards the floor 30 of the working platform 3. After a predetermined pivot angle of the connecting rod 85, and thus a predetermined pivot angle of the bar 90 towards the floor 30, the inductive sensor no longer detects the tab 87, in which situation the control circuit stops the current movement as previously mentioned to protect the operator from a crushing risk. FIG. 14 illustrates the position of the tab 87 away from the inductive sensor 62.

As this is an inductive sensor, the cover 71 is preferably chosen from a material which is neutral with respect to the operation of the sensor 62 and allows the detection of the tab 87, for example a plastic material, since the cover 71 is interposed between them. Alternatively, a local opening can be provided in the cover 71 at the inductive sensor 62, for example if the cover 71 is made of sheet metal.

The control panel 50 is provided on its side 59 with a second inductive sensor 61 for detecting whether or not it is mounted to the protection device 70: see FIG. 6. In other words, it cooperates with a corresponding part of the protection device 70, for example a tab—not shown—projecting from the support structure 72 or with the cover 71.

When the sensor 61 detects that the control panel 50 is dismounted from the protection device 70, the control circuit of the aerial work platform does not take into account the sensor 62 and is preferably provided to allow both the height movements of the working platform 3 and the movement of the aerial work platform along the ground. This is because it was found that the risk of crushing is low when the operator manipulates the manually operated control members of the control panel with one hand while holding the control panel with the other hand because, if the operator is on the working platform, he usually has enough space around him to move away from an obstacle that hits him while stopping the current movement. Thus, there is no major disadvantage in that protection is primarily provided for one or more predetermined locations on board the working platform 3.

Nevertheless, when the control panel 50 is not mounted to the protection device 70, it is advantageous to provide that the control circuit 50 allows the working platform 3 to be lifted only at a reduced speed compared to the maximum lifting speed when the control panel 50 is mounted to the protection device 70. For example, the reduced speed can be between 35% and 70% of the maximum speed, preferably 50% of the maximum speed. This speed limitation further reduces the risk of crushing of the operator handling the hand-held control panel 50 at any location of the working platform 3, as he will have more time to react if the risk should arise.

The use of inductive sensors 61 and 62 has the advantage of being robust and reliable, particularly without the risk of clogging preventing their correct operation. Alternatively, they can be replaced by any other type of suitable sensors such as optical or mechanical sensors. It is advantageous that the inductive sensors 61 and 62 or the like are arranged on or in the control panel 50, since the latter is already in communication with the control circuit of the aerial work platform. Alternatively, however, these sensors can be arranged within the housing of the protection device 70 formed by the support structure 72 and the cover 71.

It is also advantageous to provide on the control panel 50 a manually operated control member dedicated to the validation of the maximum lifting speed of the working platform 3 when the control panel 50 is mounted to the protection device 70. It can also be used to validate the maximum travel speed of the aerial work platform on the ground. In the illustrated example, this dedicated member is a push button 54. It is preferably positioned in such a way that the operator manipulating the control lever 51—or other manually operated control member(s) performing its functions—with one hand cannot press the push button 54 with a finger of that same hand. In other words, he must use his other hand to press the push button 54 simultaneously with the operation of the control lever 51. In order to simultaneously activate the control lever 51 and the push button 54, the operator is therefore forced to position himself substantially in front of the control panel 50 which corresponds to the anti-crush protection area covered by the two arms 91, 92. Alternatively, the push button 54 is replaced, for the same purpose, by any other type of manually operated control suitable and suitably arranged on the control panel 50. Alternatively, the push button 54 or the like is arranged on the protection device 70.

Thus, the control circuit of the aerial work platform allows the maximum lifting speed of the working platform 3 only and as long as the push button 54 or the like is actuated in addition to the corresponding actuation of the control lever 51 or the like. The same measure can be implemented in relation to the movement of the aerial work platform along the ground, in particular for a movement in the rear direction which is more dangerous in case the protection device 70 is arranged towards the front end of the working platform 3 as exemplified.

On the contrary, the control circuit limits the lifting speed of the working platform 3 and possibly the speed of movement of the aerial work platform along the ground in the case where the corresponding movement is commanded by actuating the control lever 51 or the like in the absence of simultaneous actuation of the push button 54. For example, the reduced speed can be between 35% and 70% of the corresponding maximum speed of the movement concerned, preferably 50% of the latter. Again, this limitation of the speed contributes to protect the operator manipulating the control lever 51 while he is not necessarily standing in the anti-crush protection area provided by the bar 90 because he will have more latitude in time to react to a crushing risk.

Alternatively, the control system can be arranged to inhibit the lifting of the working platform 3 and possibly the movement of the aerial work platform to the ground in at least one direction, or even both, in the absence of actuation of the push button 54 while the control panel 50 is mounted to the protection device 70.

The use of pivoting articulated rods for the deployment mechanism of the bar 90 is advantageous because it is simple to implement and reliable, in particular the risk of seizing is limited. The number of rods can be varied. Alternatively, the mechanism for deploying the bar 90 can be designed differently than with connecting rods, for example based on a first vertically sliding rack having a stud 81 for actuation by the control panel 50, the first rack cooperating with a pinion rotatably mounted on the support structure 72 and meshing with a second vertically sliding rack which carries a rod sliding against a spring and pivotally connected by one end to the bar 90.

Other alternatives are also possible. For example, the arms 91 and 92 of the bar 90 can be replaced by two separate corresponding bars each providing the corresponding anti-crush protection function. Alternatively, arm 92 can be omitted if it is desired to provide only the anti-crush function of arm 91 of bar 90. Conversely, it is possible to modify the protection device 70 to have a modified bar 90 having the arm 92 and the associated anti-crush function, but without being provided with an arm 91 and the associated anti-crush function.

FIGS. 17 to 22 illustrate a crush protection device 170 which is an alternative to the protection device 70 described for the embodiment of FIGS. 1 to 16.

The protection device 170 is substantially identical to the protection device 70, except that it is provided with a second bar 190 for detecting a situation in which there is a risk of crushing an operator. Although shaped differently, the two arms 91 and 92 of the first bar 90—which form a L seen from above—perform the same functions as in the previous embodiment. Alternatively, the bar 90 can be identical to the previous embodiment. Furthermore, the bar 90 is pivotally mounted on the guardrail part 41*b* independently of the—not visible—support structure 72 of the protection device 170. Alternatively, the bar 90 can be pivotally mounted to the support structure 72 as in the previous embodiment. The operation of the protection device 170 with respect to the bar 90 is the same as that of the protection device 70 described above.

With respect to the second bar 190, the operation is similar to the bar 90, except that it provides anti-crush protection only with respect to the control panel 50. When the control panel 50 is mounted to the protection device 170, the bar 190 is held in a holding position in which it extends in front of the control panel 50 while the arm 92 of the bar 90 extends above the control panel 50. The bar 190 is movable from its holding position towards the control panel 50 while being resiliently biased towards its holding position. When the movement of the bar 190 towards the control panel 50 is detected, the control circuit of the aerial work platform stops the current movement, similar to the case of the bar 90. The advantage of the bar 190 is that it allows the protection device 170 to activate more quickly than the bar 90 in the event of a crushing risk due to an obstacle striking the operator from behind as the aerial work platform moves along the ground in the rearward direction.

The ability to move the bar 190 can be provided by a connecting rod mechanism that also provides movement of the bar 90. Alternatively, the ability to move the bar 190 can be provided by a separate mechanism from that of the bar 90.

Figure 19:
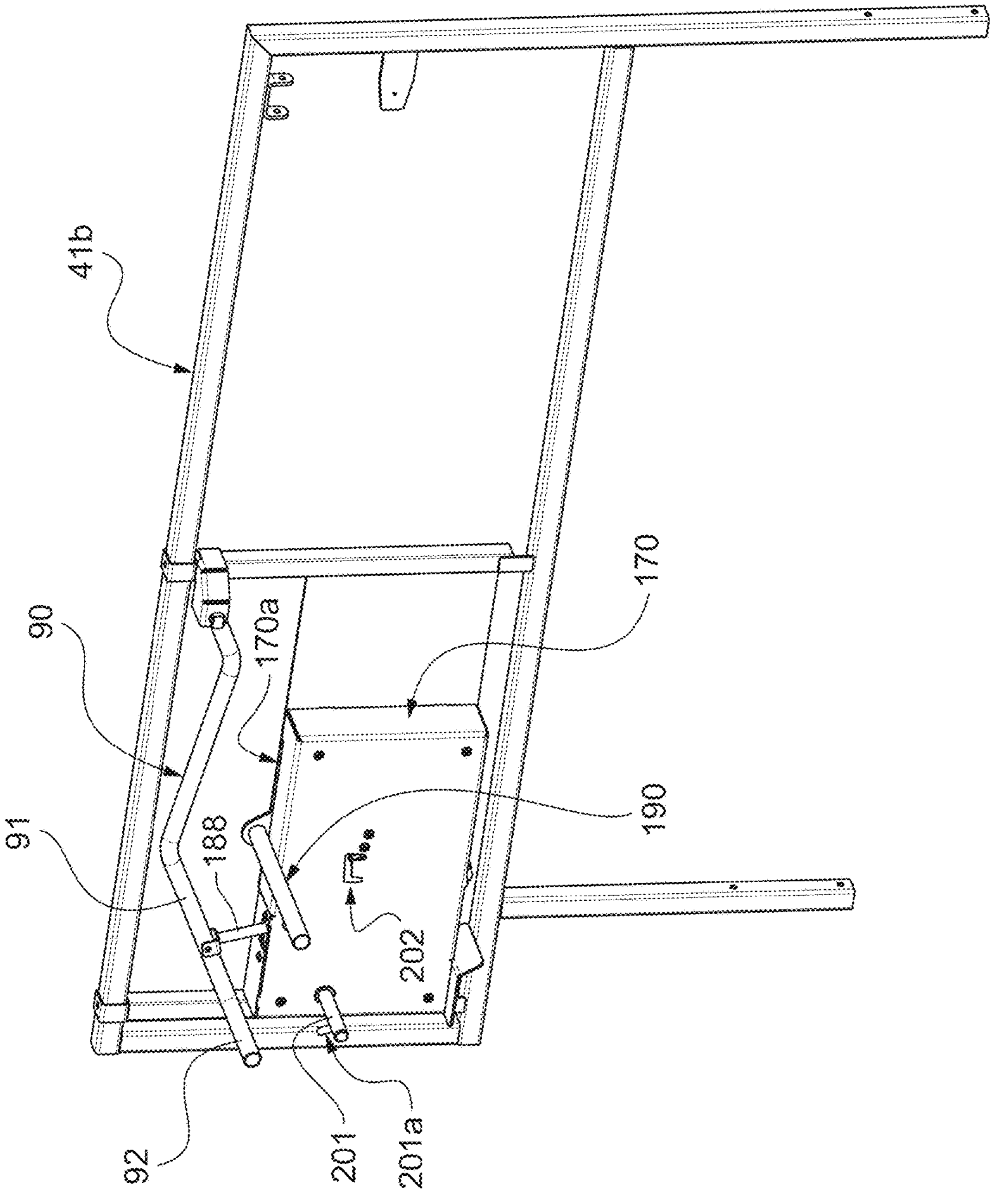

When the control panel 50 is dismounted from the protection device 170, both bars 90 and 190 extend at a level less than or equal to the upper part of the adjacent section 41*b* of the guardrail 40 as seen in FIG. 19.

Figure 17:
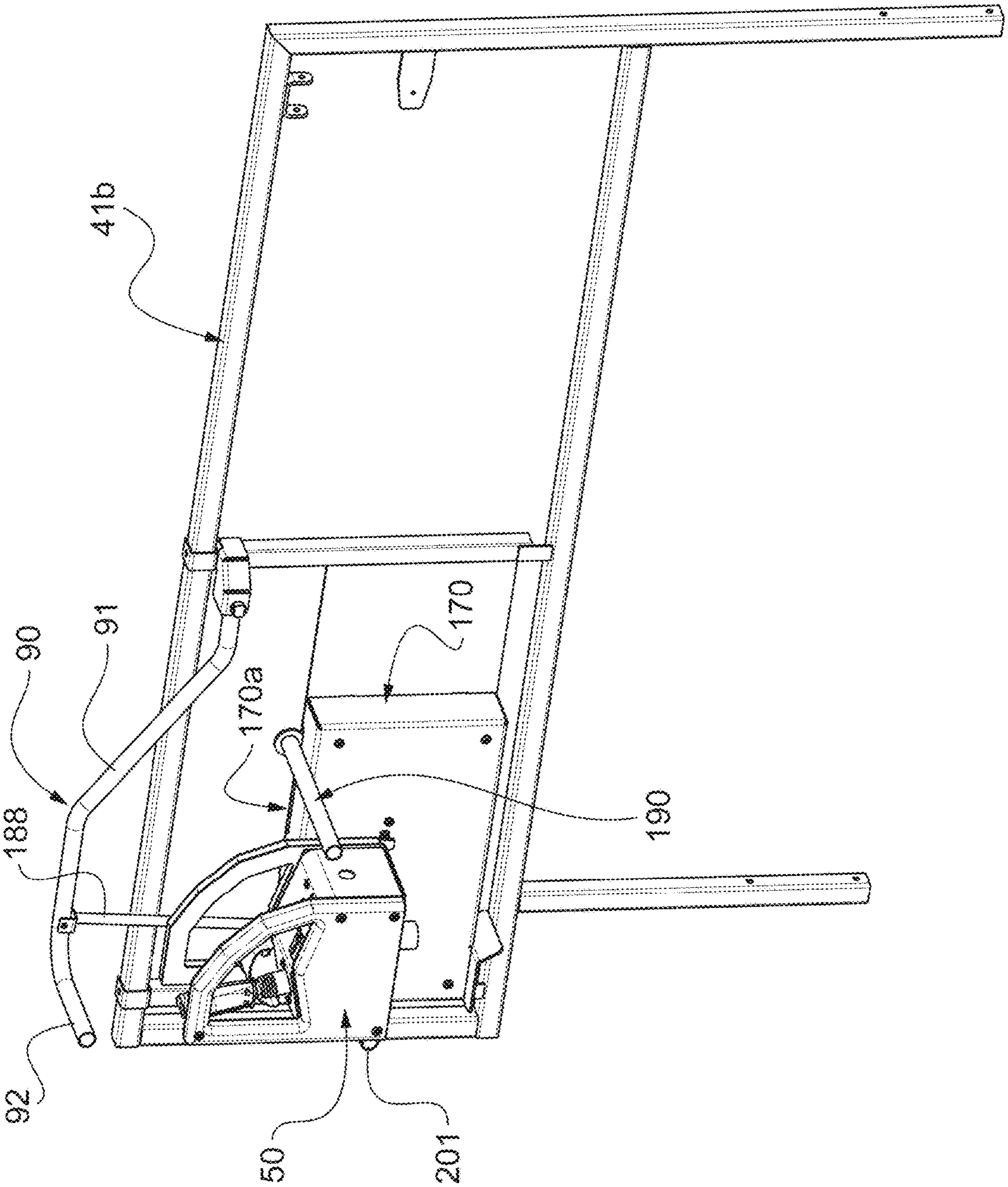
FIGS. 17 to 22 illustrate a variant of the crush protection device of the aerial work platform of the embodiment of FIGS. 1 to 16, the protection device having in this variant two anti-crush detection bars.
Figure 18:
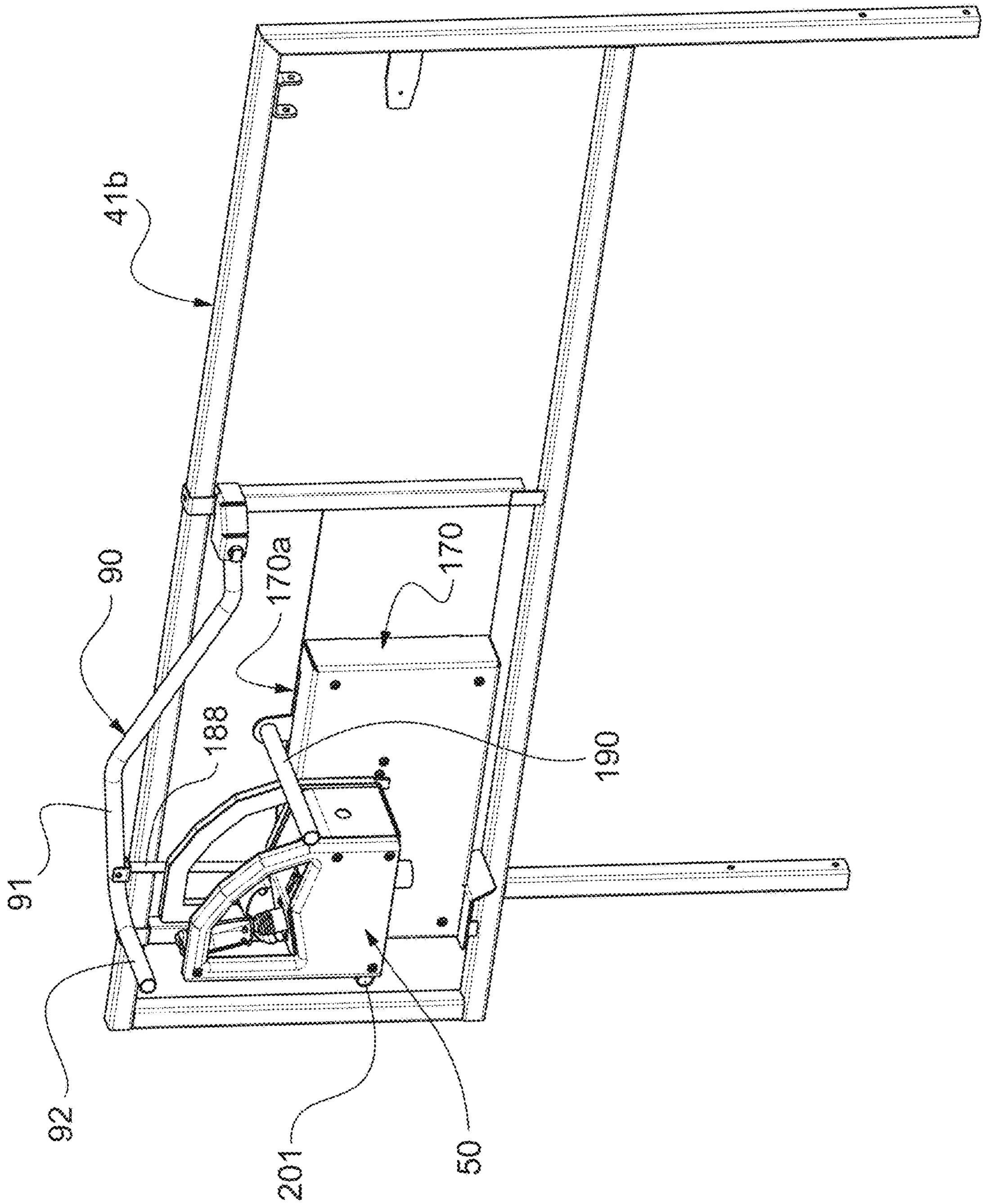

As can be seen in FIGS. 17 to 19, the protection device is provided with a different mounting system for the control panel 50 than in the previous embodiment. In this case, it comprises a fixed rod 201 on which a tube fixedly arranged at the rear of the control panel 50 engages. Advantageously, the fixed rod 201 may include a radially projecting pin 201*a* serving as a guide member engaging a guide slot in the tube of the control panel 50 that extends along the longitudinal direction of the tube: this allows an angular orientation to be imposed on the control panel 50 about the rod 201 as the tube engages the rod 201. The mounting system of the protection device 170 preferably comprises a fixed support element such as a tab or a rod—not shown—on which the lower part of the control panel 50 rests when mounted on the protection device 170. A locking system can be provided to hold the control panel 50 in place on the protection device 170. This may include a U-shaped rod forming a loop projecting laterally from the side 59 of the control panel 50 that enters the notch 202 where a lock cooperates with a portion of the rod. The lock can be designed similar to the lock 74 described in relation to FIGS. 15 and 16 of the preceding embodiment. One will understand that the mounting system can be varied. In particular, it can be identical to the previous embodiment.

Figure 20:
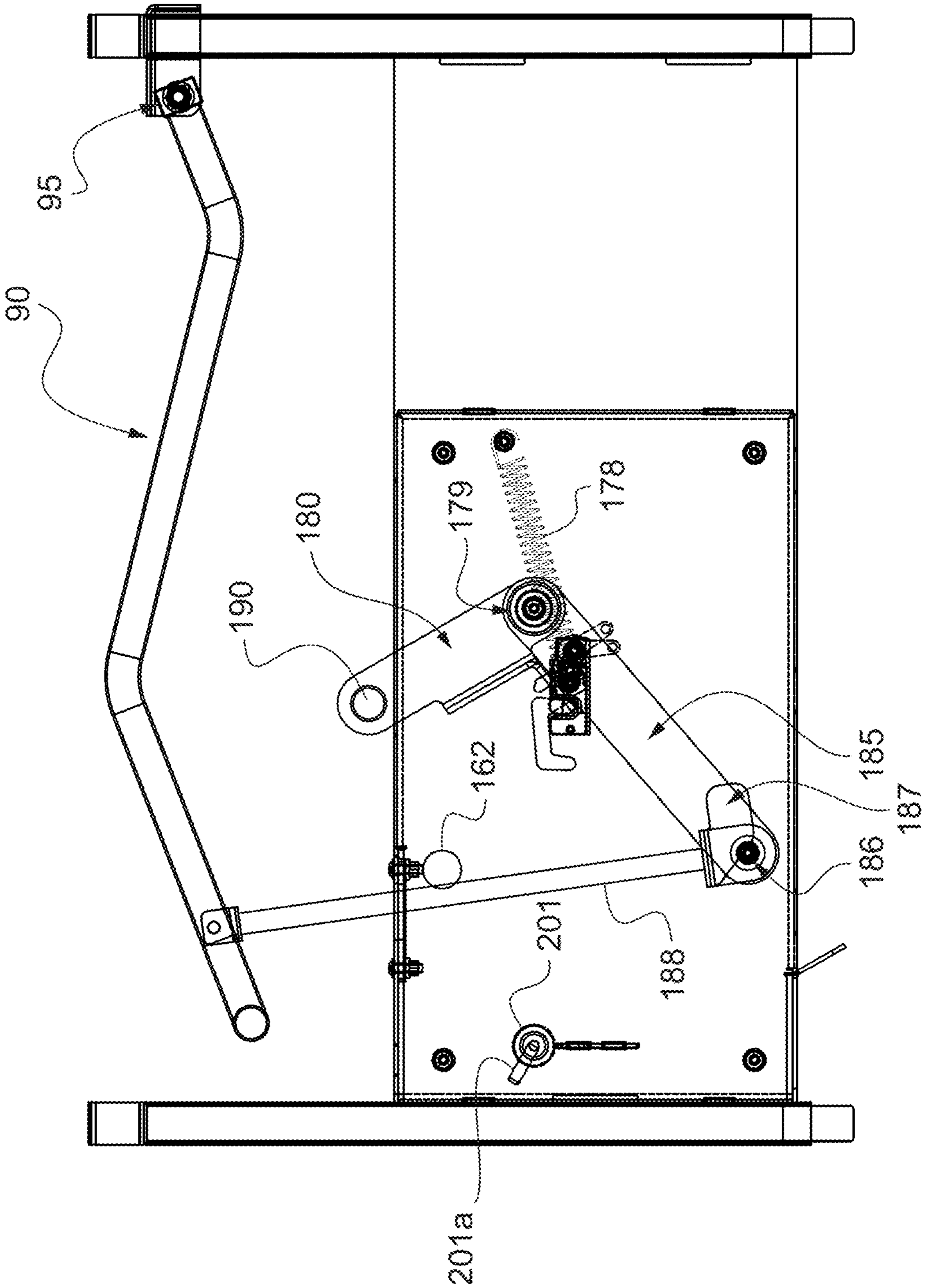
Figure 21:
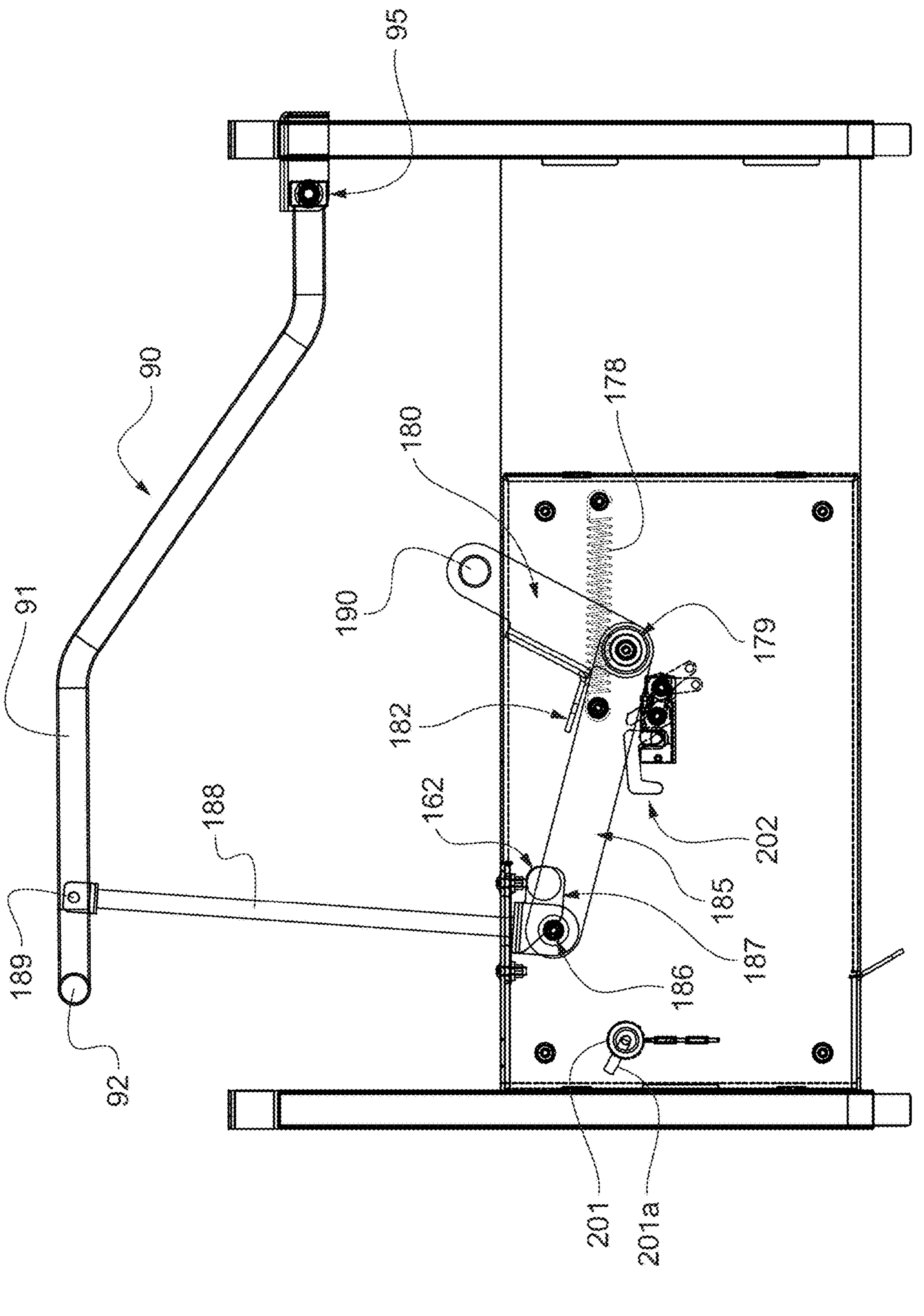
Figure 22:
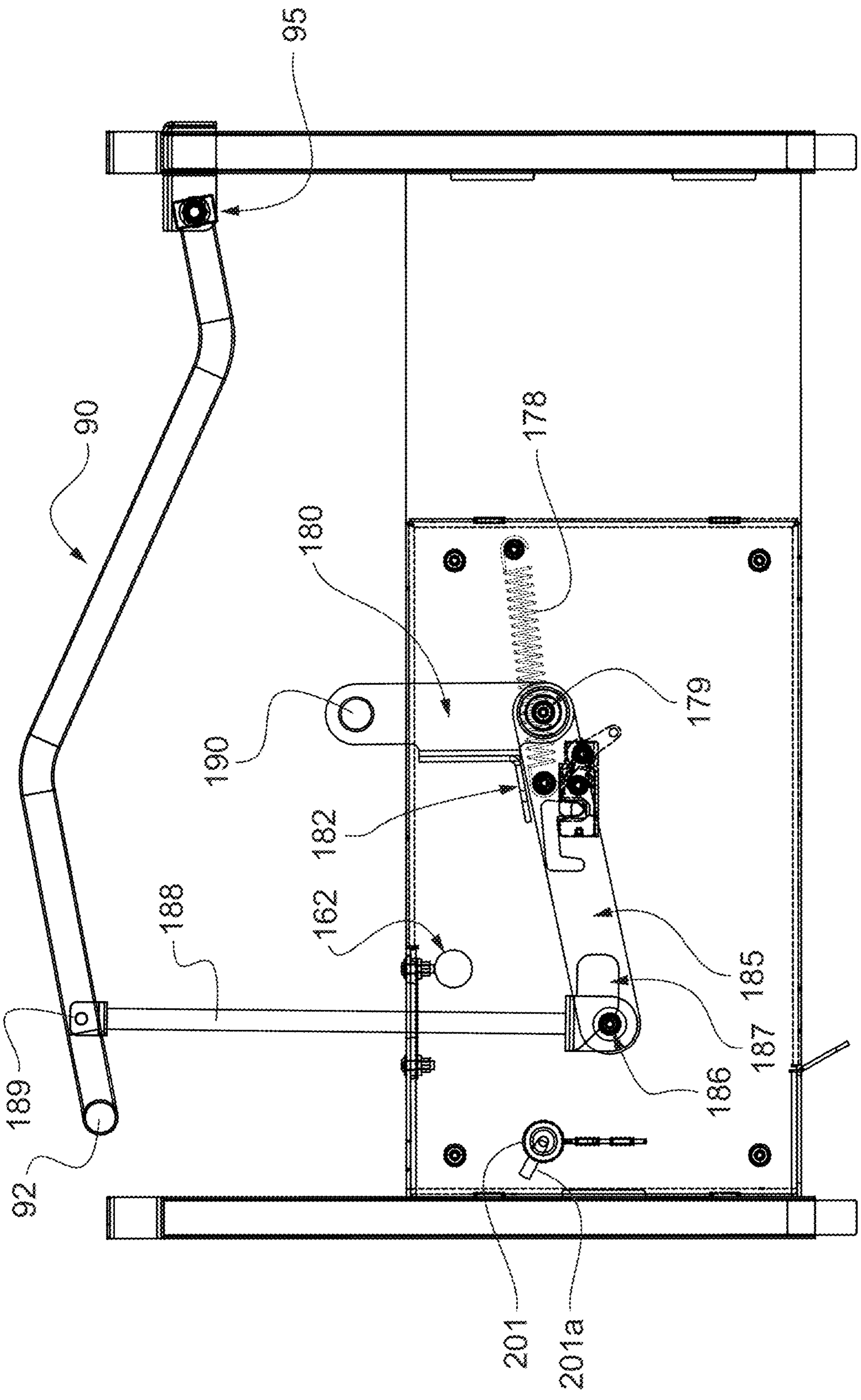

FIGS. 20 to 22 illustrate an example of a deployment mechanism for the bars 90 and 190 to move them between their holding and lowered positions, as well as to allow them to be moved downwardly, respectively toward the control panel 50 from their holding position upon actuation in that direction while the control panel 50 is mounted to the protection device 70. In order to make the mechanism visible, the cover of the protection device is drawn transparent in FIGS. 20 to 22. This mechanism comprises three connecting rods 180, 185 and 188.

The connecting rod 180 is pivotally mounted at 179 about a pin on the support structure of the protection device 170. One end of the connecting rod 180 is provided with the bar 190. The connecting rod 180 has a stop surface 182 for cooperating with the connecting rod 185 to stop their relative pivoting in a pivoting direction.

The connecting rod 185 is also pivotally mounted on the protection device support structure 179 about the same pin as the connecting rod 180. One end of the connecting rod 185 is pivotally connected at 186 to one end of the connecting rod 188.

At its other end, the connecting rod 188 is pivotally mounted at 189 to the bar 90 either directly or indirectly through a structural member rigidly associated with the bar 90.

A helical spring 178 is hooked by one end to the connecting rod 185 and by its other end to the support structure of the protection device. Under the action of spring 178, the connecting rod mechanism can assume two distinct stable positions.

The first stable position is shown in FIG. 20. The bar 90 is then in a lowered position, at a level lower than or equal to that of the section 41*b* of the guardrail 40. The bar 190 is in any case at a level lower than or equal to that of the section 41*b* of the guardrail 40. Advantageously, the connecting rod mechanism can be placed in this first stable position when the control panel 50 is dismounted from the protection device 170. In this first stable position, the connecting rod 185 is held resiliently by the spring 178 in a downwardly pivoted position, which has the effect of holding the bar 90 in a lowered position through the connecting rod 188.

The connecting rod mechanism can be operated against the bias of spring 178 to move from this first stable position to its second stable position shown in FIG. 21. In this second stable position, the bars 90 and 190 are in their deployed position allowing to detect a situation of risk of crushing of the operator. This time, the spring 178 holds the connecting rod 185 in an upwardly pivoted position. As a result, the bar 90 is resiliently held in an extended position by the connecting rod 188. The connecting rod 180 is also held resiliently in the extended position by the action of the connecting rod 185 on the stop 182.

The transition from the first stable position to the second stable position can be performed manually prior to mounting the control panel 50 to the protection device 170, for example by pulling up the bar 90. Alternatively, it may advantageously be provided that the control panel 50 directly or indirectly loads the connecting rod mechanism during the mounting operation of the control panel 50 to the protection device 170. Conversely, the transition from the second stable position to the first stable position can be made manually after the control panel 50 has been dismounted from the protection device 170, for example by pushing down the bar 90.

As mentioned, in the deployed position of FIG. 21, the protection device is active. Therefore, if the bar 190 is pushed towards the control panel 50, in particular by the operator under the action of an obstacle hitting it, the connecting rod 180 pivots and causes the connecting rod 185 to pivot against the bias of the spring 78. This also has the effect of lowering the bar 90 through the connecting rod 188. FIG. 22 illustrates the new positioning of the connecting rods and bars 90 and 190.

In the case where it is the bar 90 that is pushed down, the movement of the bar 90 causes the connecting rod 188 and the connecting rod 185 to move against the bias of the spring 178.

In both cases, the displacement of the bar 190, respectively 90, is detected by a sensor 162 cooperating with a detection tab 187. In this example, the sensor 162 is fixedly arranged on the protection device while the detection tab 187 is fixedly arranged on the connecting rod 188. The detection system formed by the sensor 162 and the detection tab 187 operates in a similar manner to that formed by the sensor 62 and the detection tab 87 of the previous embodiment.

For the convenience of using the control panel 50, it is preferable that its mounting to the mounting system of the protection device 70, 170, as well as the dismounting of the control panel 50, can be carried out manually without tools, as can be seen, in particular, from the description of the two described embodiments.

Of course, the present invention is not limited to the embodiment and the examples described and depicted, but is susceptible to numerous other variants accessible to the person skilled in the art.

The invention claimed is:

1. An aerial work platform, comprising:

a working platform comprising a floor and a guardrail;

a lifting mechanism coupled to the working platform and adapted to move the working platform in height;

a control panel adapted to control the lifting mechanism; and a protection device adapted to protect an operator on board the working platform from being crushed against at least one of the guardrail and the control panel;

the protection device comprising:

a bar mounted on the working platform so as to be adjacent to a section of the guardrail; and a mounting system provided for removably mounting the control panel thereto so as to hold it in place on board the working platform in a predefined mounting position which is adjacent to said section of the guardrail and adjacent to the bar, wherein:

the bar is configured and mounted on the working platform such that, when the control panel is mounted to the mounting system, the bar is held in a holding position in the vicinity of at least one of the control panel and said section of the guardrail with the possibility to move towards the control panel, respectively towards said section of the guardrail; and the protection device further comprises at least one sensor adapted to detect whether the bar is pushed towards the control panel or towards said section of the guardrail respectively.

2. An aerial work platform according to claim 1, wherein:

the possibility for the bar to move from the holding position towards the control panel, respectively towards said section of the guardrail is effected against a resilient force biasing the bar towards the holding position; and/or the possibility for the bar to move towards the control panel, respectively towards said section of the guardrail, is done by pivoting.

3. An aerial work platform according to claim 1, the bar is exclusively mounted on the working platform by one end of the bar.

4. An aerial work platform according to claim 1, wherein the bar is configured and mounted to the working platform such that, when the control panel is mounted to the mounting system, the bar satisfies at least one of the following three characteristics:

i) in the holding position of the bar, at least one portion of the bar is arranged laterally with respect to a side of the control panel oriented towards said section of the guardrail and extends in a plane perpendicular to the floor of the working platform which is substantially parallel to an upper part of said section of the guardrail, said portion of the bar further extending at a level above said section of the guardrail and the bar being able to move towards the floor of the working platform;

ii) in the holding position of the bar, at least one portion of the bar extends above the control panel, the bar being movable so that said portion moves towards the floor of the working platform; and iii) in the holding position of the bar, at least one portion of the bar extends in front of the control panel, the bar being movable so that the said at least one portion of the bar moves towards the control panel.

5. An aerial work platform according to claim 1, wherein:

the bar is movable between the holding position in which the bar extends at least partially above the level of said section of the guardrail, and a lowered position in which the bar extends entirely at a level less than or equal to the upper part of said section of the guardrail; and the protection device comprises a bar deployment mechanism adapted to cooperate with the control panel so as:

to move the bar into the holding position when the control panel is mounted to the mounting system; and to move the bar into the lowered position when the control panel is dismounted from the mounting system.

6. An aerial work platform according to claim 5, wherein the bar deployment mechanism comprises connecting rods articulated to each other, a first connecting rod of which is provided to cooperate with the control panel to move the bar into the holding position via at least a second connecting rod when the control panel is mounted to the mounting system.

7. An aerial work platform according to claim 6, wherein the bar deployment mechanism comprises:

two connecting rods articulated to each other, capable of being brought into abutment with each other to stop their relative pivoting in a pivoting direction; and a spring biasing the two connecting rods into abutment with each other so as to hold the bar in the holding position when the control panel is mounted to the mounting system, wherein the possibility of the bar to move from the holding position towards the control panel, respectively towards said section of the guardrail, is achieved by pivoting the two connecting rods against the spring biasing the two connecting rods.

8. An aerial work platform according to claim 5, wherein the bar moves to the lowered position by gravity when the control panel is dismounted from the mounting system.

9. An aerial work platform according to claim 1, wherein:

the control panel comprises at least a first manually operated control member to command the movement of the working platform in height or both the movement of the working platform in height and a movement of the aerial work platform along the ground; and the aerial work platform further comprises:

a sensor adapted to detect whether the control panel is mounted to the mounting system or dismounted from the mounting system; and a control circuit provided to limit a speed of movement of the working platform in height or both the speed of movement of the working platform in height and a speed of movement of the aerial work platform along the ground when the sensor determines that the control panel is dismounted from the mounting system.

10. An aerial work platform according to claim 9, wherein:

the control panel or the protection device further comprises at least one second manually operated control member arranged relative to the first manually operated control member, when the control panel is mounted to the mounting system of the protection device, such that simultaneous actuation of the first manually operated control member and the second manually operated control member by an operator requires him to use a respective hand for the actuation of each; and the control circuit is provided:

to limit the speed of movement of the working platform in height or both the speed of movement of the working platform in height and the speed of movement of the aerial work platform along the ground, or to inhibit movement of the working platform in height or both the movement of the working platform in height and the movement of the aerial work platform along the ground, in the case where the corresponding movement is commanded by actuation of the first manually operated control member in the absence of simultaneous actuation of the second manually operated control member as compared to the case where the corresponding movement is commanded by actuation of the first manually operated control member with simultaneous actuation of the second manually operated control member.

11. An aerial work platform according to claim 10, wherein:

said predefined mounting position of the control panel is located towards a first end of the working platform, the bar is configured and mounted to the working platform such that, when the control panel is mounted to the mounting system and the bar is in the holding position, at least one portion of the bar is arranged laterally with respect to a side of the control panel oriented towards said section of the guardrail and extends in a plane perpendicular to the floor of the working platform which is substantially parallel to an upper part of said section of the guardrail, said portion of the bar further extending at a level above said section of the guardrail and beyond the control panel in the direction of a second end of the working platform opposite the first end and the bar being able to move towards the floor of the working platform, and the first and second manually-operated control members are arranged such that their simultaneous actuation by the operator requires the operator to position himself adjacent to said portion of the bar.

12. An aerial work platform according to claim 1, wherein the bar is configured and mounted to the working platform such that, when the control panel is mounted to the mounting system and the bar is in the holding position, at least one portion of the bar is arranged laterally with respect to a side of the control panel oriented towards said section of the guardrail and extends in a plane perpendicular to the floor of the working platform which is substantially parallel to an upper part of said section of the guardrail, said portion of the bar further extending at a level above said section of the guardrail and the bar being able to move towards the floor of the working platform, and wherein the said portion of the bar is provided with a screen extending parallel to said section of the guardrail towards the floor of the working platform so as to close a passage between said portion of the bar and the upper part of said section of the guardrail over a major part of the length of said portion of the bar.

13. An aerial work platform according to claim 1, wherein said predefined mounting position of the control panel is located towards a first end of the working platform, and wherein the bar is configured and mounted to the working platform such that, when the control panel is mounted to the mounting system and the bar is in the holding position, at least one portion of the bar is arranged laterally with respect to a side of the control panel oriented towards said section of the guardrail and extends in a plane perpendicular to the floor of the working platform which is substantially parallel to an upper part of said section of the guardrail, said portion of the bar further extending at a level above said section of the guardrail and beyond the control panel in the direction of a second end of the working platform opposite the first end and the bar being able to move towards the floor of the working platform.

14. An aerial work platform according to claim 1, wherein in orthogonal projection on the floor of the working platform, the bar has an L-shape formed by a first and a second arm and wherein the bar is configured and mounted to the working platform such that, when the control panel is mounted to the mounting system and the bar is in the holding position:

at least one portion of the first arm of the L-shaped bar is arranged laterally with respect to a side of the control panel oriented towards said section of the guardrail and extends in a plane perpendicular to the floor of the working platform which is substantially parallel to an upper part of said section of the guardrail, the said portion of the bar further extending at a level above said section of the guardrail and the bar being able to move towards the floor of the working platform, and at least one portion of the second arm of the L-shaped bar extends above the control panel, the bar being movable so that said portion moves towards the floor of the working platform.

15. An aerial work platform according to claim 14, wherein:

said predefined mounting position of the control panel is located towards a first end of the working platform, said portion of the first arm of the L-shaped bar extends beyond the control panel in the direction of a second end of the working platform opposite the first end, and a free end of the first arm of the L-shaped bar is hinged to said section of the guardrail at a location which is beyond the control panel towards the second end of the working platform.

16. An aerial work platform according to claim 1, wherein the control panel is adapted to be removably mounted to the mounting system of the protection device so that it can be moved and used by the operator at different locations of the working platform.

17. An aerial work platform according to claim 1, wherein the control panel is adapted to be used, at the operator's choice, hand-held or mounted on the working platform, the control panel being mountable on the working platform by means of the mounting system.

18. An aerial work platform according to claim 17, wherein the control panel comprises control members, the control panel being adapted so that an operator can simultaneously hold it with one hand and manipulate the control members with the other hand.

19. An aerial work platform according to claim 18, wherein the control panel has a handle for holding it with one hand.

20. An aerial work platform according to claim 1, wherein the control panel is adapted to be mounted manually to and removed manually from the mounting system of the protection device without the use of tools.

* * * * *